(12) United States Patent
Schutt et al.

(10) Patent No.: US 6,452,485 B1
(45) Date of Patent: *Sep. 17, 2002

(54) ELECTRONIC SYSTEM FOR MONITORING A FIFTH WHEEL HITCH

(75) Inventors: Randy L. Schutt; Steven C. Dupay, both of Holland; Michael H. Ginocchio, Grand Haven; Kurt A. Dykema, Holland, all of MI (US)

(73) Assignee: The Holland Group, Inc., Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/945,936

(22) Filed: Sep. 4, 2001

Related U.S. Application Data

(63) Continuation-in-part of application No. 09/493,534, filed on Jan. 28, 2000, now Pat. No. 6,285,278.

(51) Int. Cl.[7] .................................. G08B 21/00
(52) U.S. Cl. ................. 340/431; 340/686.2; 340/686.6; 280/435; 280/DIG. 14
(58) Field of Search ................................ 340/431, 438, 340/439, 686.1, 686.2, 686.6, 687, 689; 280/433, 434, 435, DIG. 14

(56) References Cited

U.S. PATENT DOCUMENTS

| | | | |
|---|---|---|---|
| 2,982,566 A | 5/1961 | Geerds | 280/435 |
| 3,013,815 A | 12/1961 | Geerds | 280/435 |
| 3,535,679 A | 10/1970 | Connors | 240/431 |
| 3,640,549 A | 2/1972 | Neff et al. | 280/435 |
| 3,697,974 A | 10/1972 | Harris et al. | 340/431 |
| 3,868,127 A | 2/1975 | Marulic et al. | 280/434 |
| 4,258,421 A | 3/1981 | Juhasz et al. | 701/35 |
| 4,428,595 A | 1/1984 | Martin et al. | 280/435 |
| 4,614,355 A | 9/1986 | Koch | 280/438.1 |
| 4,649,369 A | 3/1987 | Walker et al. | 340/438 |
| 4,669,748 A | 6/1987 | LeVee | 280/423.1 |
| 4,685,695 A | 8/1987 | LeVee | 280/441.2 |
| 4,809,177 A | 2/1989 | Windle et al. | 701/1 |
| 5,108,123 A | 4/1992 | Rubenzik | 280/477 |
| 5,456,484 A | 10/1995 | Fontaine | 280/434 |
| 5,477,207 A | 12/1995 | Frame, Sr. et al. | 340/431 |
| 5,506,773 A | 4/1996 | Takaba et al. | 340/438 |
| 5,549,166 A | 8/1996 | Orbach et al. | 172/4 |
| 5,583,770 A | 12/1996 | Sekido et al. | 340/438 |
| 5,696,676 A | 12/1997 | Takaba | 340/438 |
| 5,757,645 A | 5/1998 | Schneider et al. | 701/29 |
| 5,861,802 A | 1/1999 | Hungerink et al. | 340/431 |
| 5,917,408 A | 6/1999 | Cardillo et al. | 340/439 |
| 5,964,813 A | 10/1999 | Ishii et al. | 701/35 |
| 6,100,794 A | 8/2000 | Hillier | 340/431 |

FOREIGN PATENT DOCUMENTS

| | | |
|---|---|---|
| DE | 3018905 | 11/1980 |
| DE | 3604185 | 8/1987 |
| DE | 3803931 | 8/1989 |
| DE | 4013672 | 10/1991 |
| DE | 19820139 | 11/1999 |

OTHER PUBLICATIONS

Dieter Raab, "Remote Control of Fifth Wheel Couplings", Truck Technology International, 1990 (4 pages).
Truck Tech advertisment, "Contvertible–Jaw Fifthwheel Senses Kingpin," Nov. 1991, p. 151 .

*Primary Examiner*—Van Trieu
(74) *Attorney, Agent, or Firm*—Price, Heneveld, Cooper, DeWitt & Litton

(57) ABSTRACT

An electronic system that includes a trailer sensor, a lock sensor and a control circuit determine whether a trailer hitch assembly is properly coupled to a trailer. The trailer sensor senses the position of the trailer relative to the trailer hitch assembly and the lock sensor senses the position of the locking mechanism. The control circuit is coupled to the trailer sensor and the lock sensor and masks an output of the lock sensor for a first predetermined stabilization period after the control circuit initially determines that the trailer hitch assembly is properly coupled to the trailer.

30 Claims, 22 Drawing Sheets

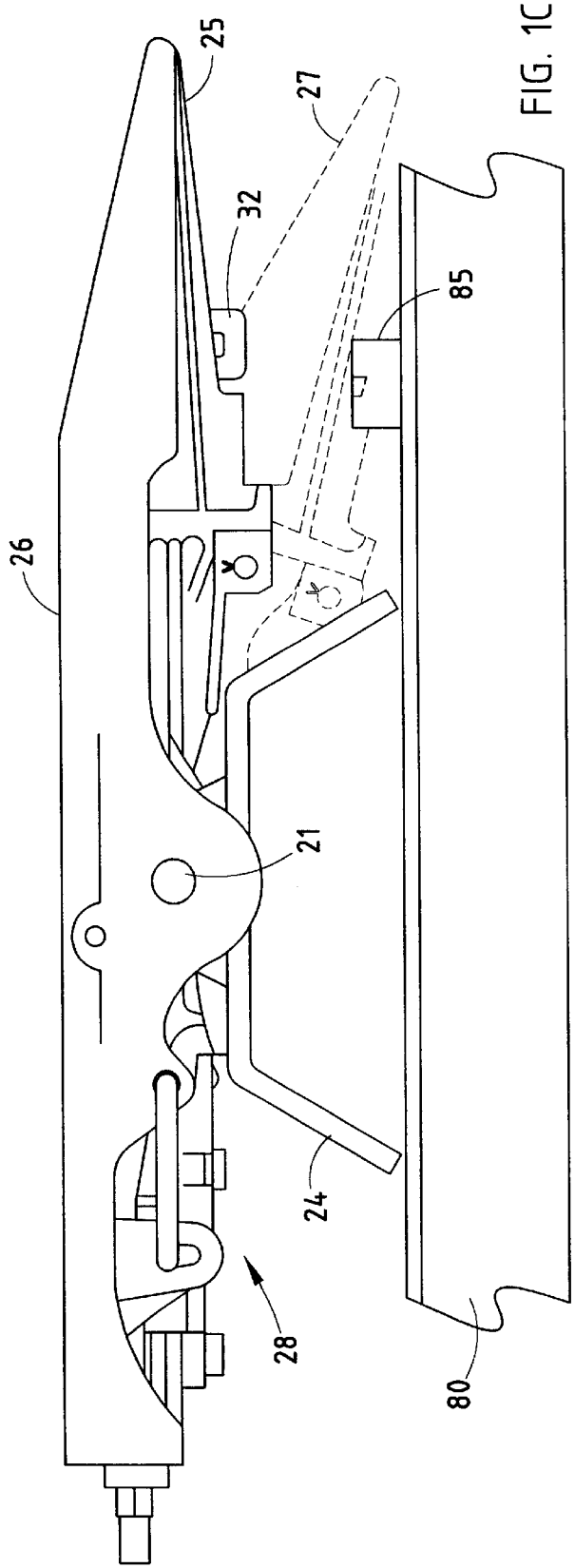
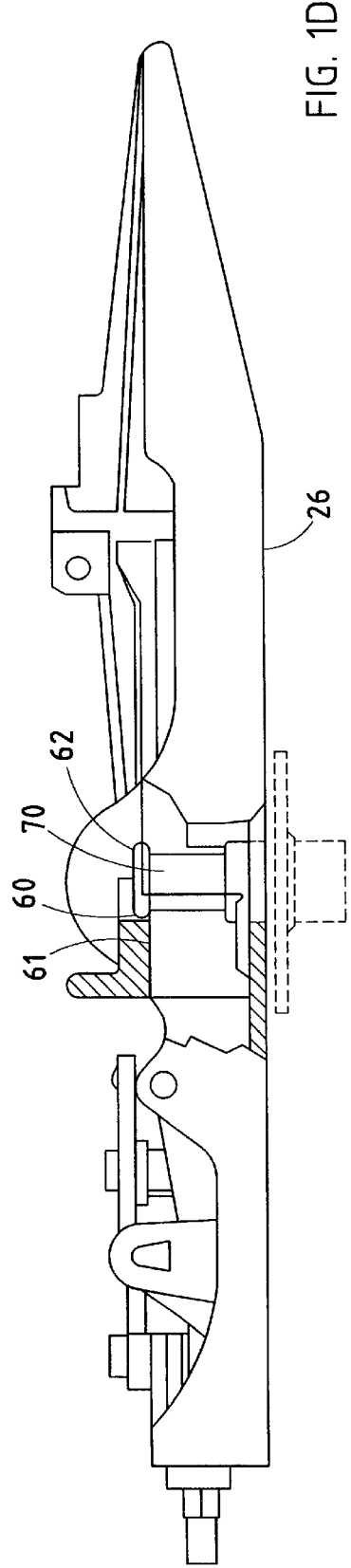

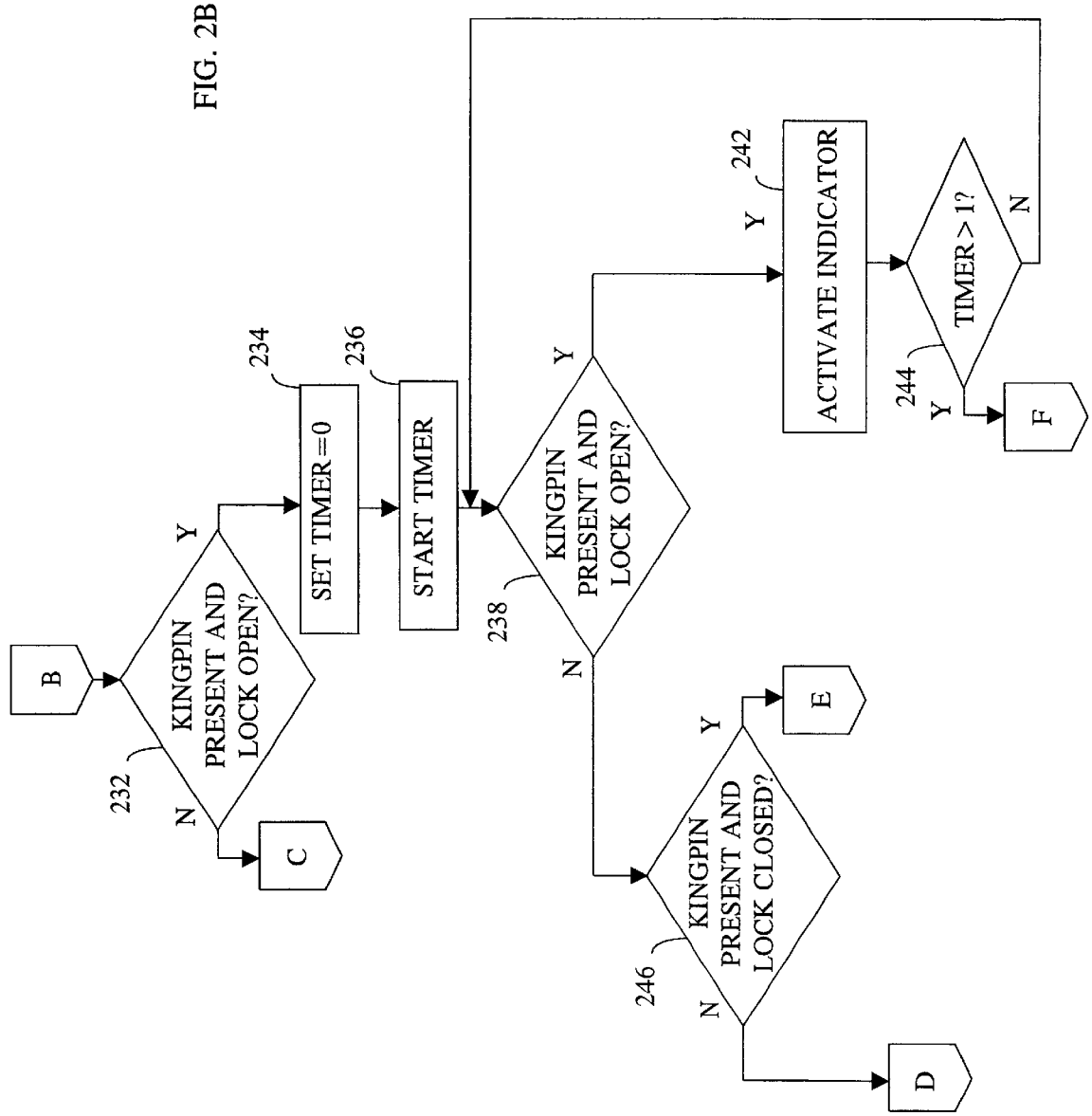

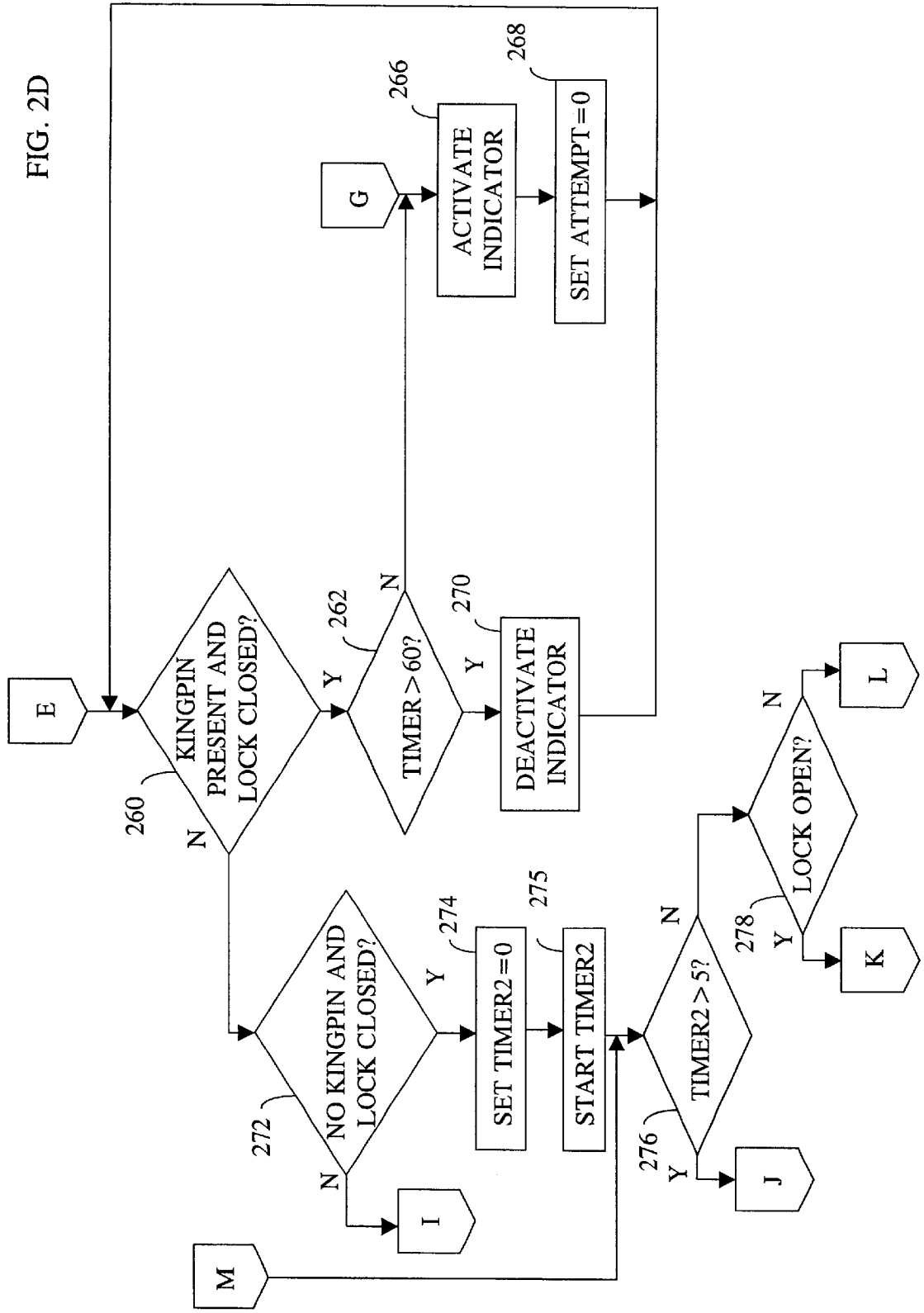

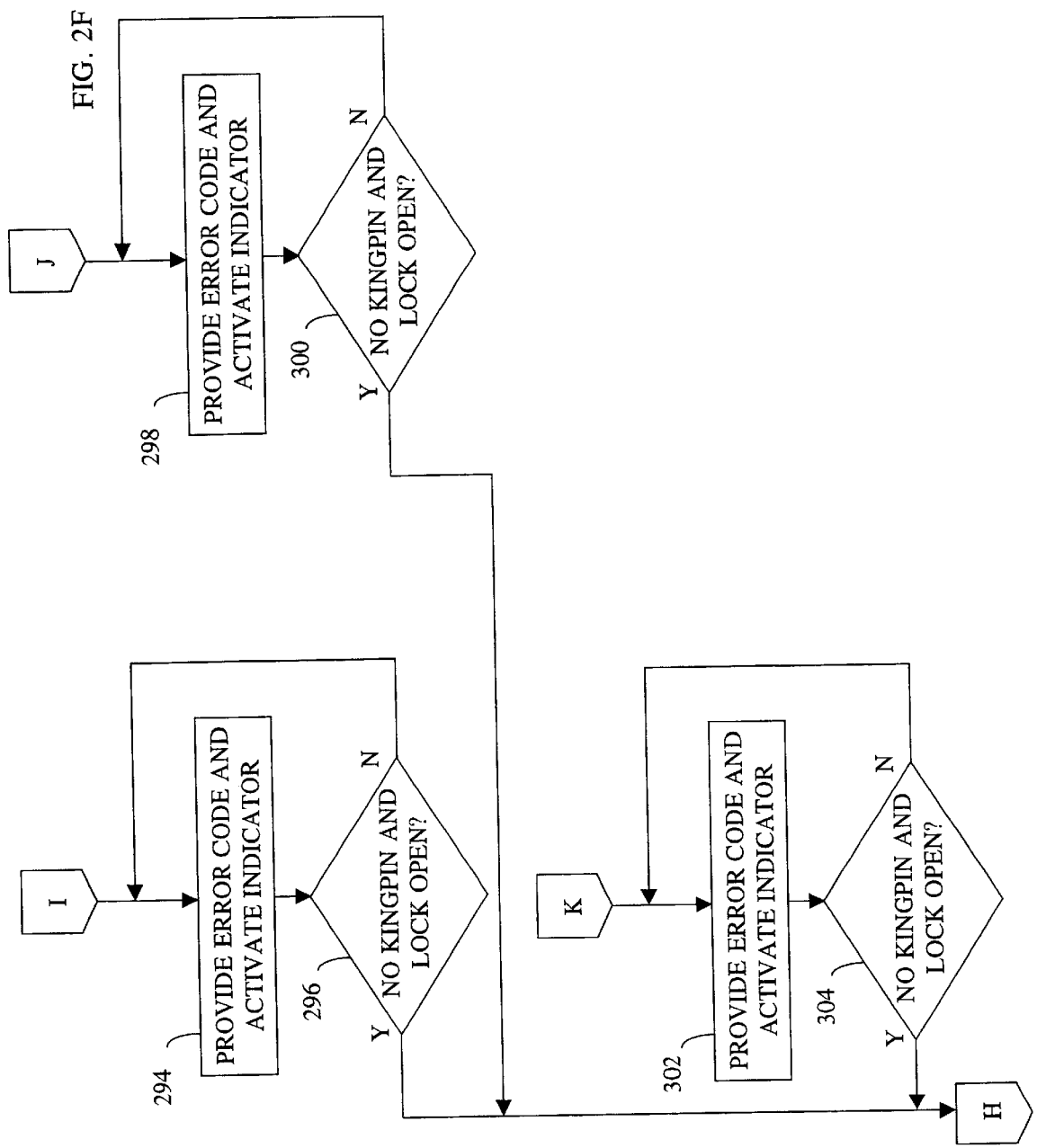

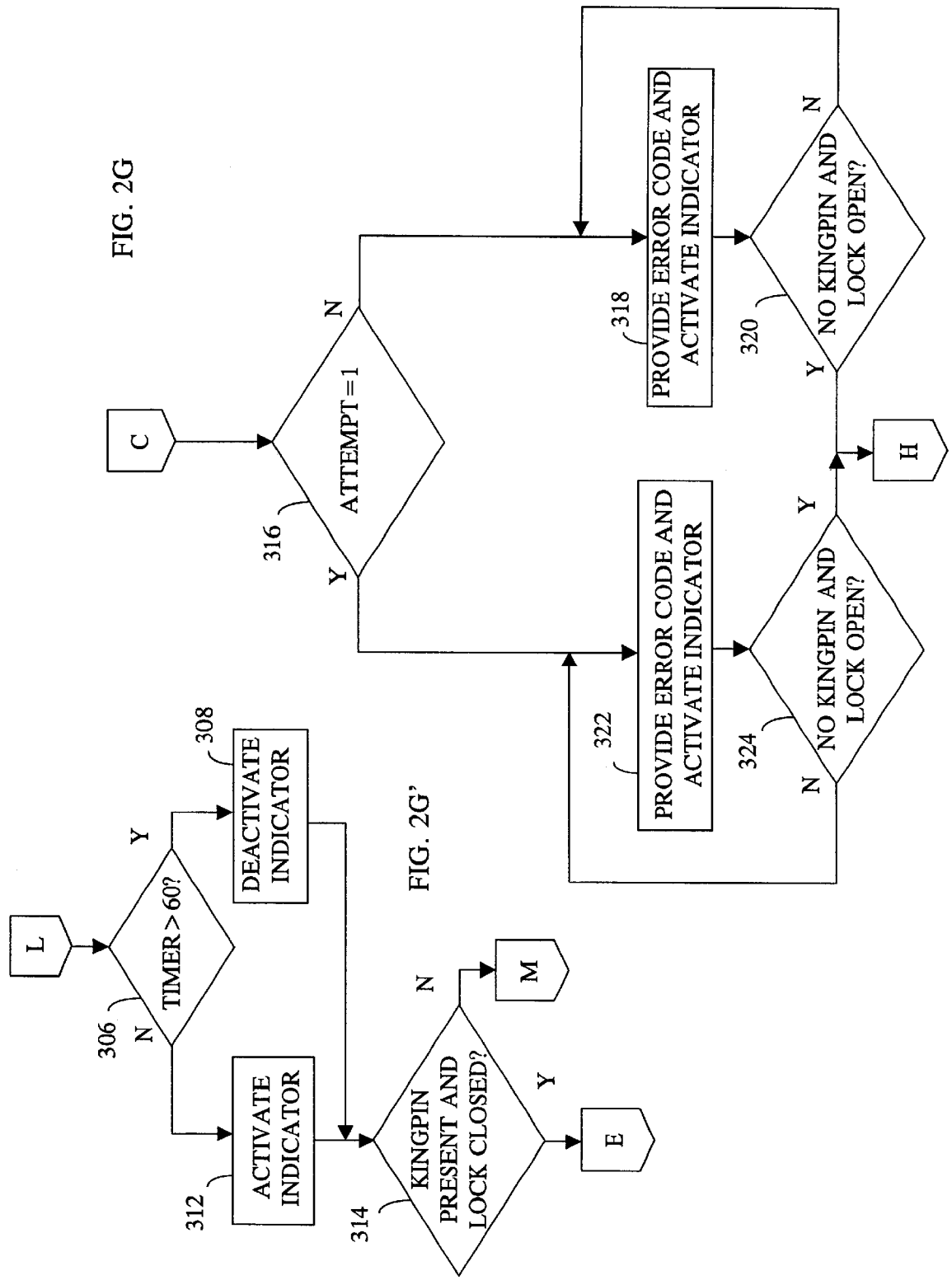

ELECTRONIC SYSTEM FOR MONITORING
A FIFTH WHEEL HITCH

This application is a continuation-in-part of U.S. patent application Ser. No. 09/493,534 (now U.S. Pat. No. 6,285, 278) entitled "Electronic System for Monitoring a Fifth Wheel Hitch," filed Jan. 28, 2000, by Randy L. Schutt et al., the entire disclosure of which is incorporated herein by reference.

BACKGROUND OF THE INVENTION

The present invention is directed to an electronic system for monitoring the coupling of a trailer to a trailer hitch assembly that is mounted on a truck chassis and, more specifically, to an electronic system that indicates whether the trailer is properly coupled to the trailer hitch assembly.

An electronic coupling control system for a vehicle trailer hitch assembly is described in U.S. Pat. No. 5,861,802, entitled "FIFTH WHEEL HITCH COUPLING CONTROL SYSTEM" to Hungerink et al., which is assigned to the assignee of the present invention and is hereby incorporated herein by reference. U.S. Pat. No. 5,861,802 discloses an electronic coupling control system that includes a trailer proximity sensor for sensing when a trailer is in the proximity of the hitch assembly, a kingpin sensor for sensing the presence of a trailer kingpin in a hitch plate throat and a lock sensor for sensing when the locking mechanism is locked in a secured position.

U.S. Pat. No. 5,861,802 also discloses an indicator located within the vehicle for providing trailer hitch assembly coupling status information to a driver of the vehicle. A control circuit is coupled to the trailer proximity sensor, the kingpin sensor, the lock sensor and the indicator. These sensors are utilized by the control circuit to inform a driver when a trailer is in close proximity to the trailer hitch assembly, when the trailer kingpin is positioned in the hitch throat and when the locking mechanism is in a locked position. The electronic coupling control system also includes an interface for coupling a control input, of an electrical control system of the vehicle, to the electronic coupling control system. The electronic coupling control systen is also capable of performing various self-diagnostic routines to ensure proper operation of the system, when the vehicle ignition is turned on.

While the electronic coupling control system of U.S. Pat. No. 5,861,802 advantageously provides some information to a user, it would be desirable for an electronic control coupling system to reliably provide additional information to a user.

SUMMARY OF THE INVENTION

An embodiment of the present invention is directed to an electronic system for monitoring a trailer hitch assembly, which includes a hitch plate with a throat for receiving a kingpin of a trailer and a locking mechanism for locking the kingpin in the throat. The system determines whether the trailer hitch assembly is properly coupled to the trailer and includes a trailer sensor, a lock sensor and a control circuit. The trailer sensor senses the position of the trailer relative to the trailer hitch assembly. The lock sensor senses the position of the locking mechanism and the control circuit is coupled both to the trailer sensor and the lock sensor. The control circuit determines whether the trailer hitch assembly is properly coupled to the trailer by taking into account the sequence in which the trailer sensor and the lock sensor sense the respective positions of the trailer and locking mechanism and masks an output of the lock sensor for a first predetermined stabilization period after the control circuit initially determines that the trailer hitch assembly is properly coupled to the trailer.

These and other features, advantages and objects of the present invention will be further understood and appreciated by those skilled in the art by reference to the following specification, claims and appended drawings.

BRIEF DESCRIPTION OF THE DRAWINGS

In the drawings:

FIG. 1C is a side view of the trailer hitch assembly of FIG. 1A;

FIG. 1D is a side view and partial cross-section of the trailer hitch assembly shown in FIG. 1B;

FIGS. 2A–2G' are a flow diagram of a routine for determining and displaying coupling status information to a driver of the truck tractor of FIG. 1A, according to an embodiment of the present invention;

DETAILED DESCRIPTION OF PREFERRED EMBODIMENTS

The present invention is directed to an electronic system that monitors a trailer hitch assembly that includes a hitch plate with a throat for receiving a kingpin of a trailer and a locking mechanism for locking the kingpin in the throat. A control circuit of the system determines whether the trailer hitch assembly is properly coupled to the trailer by monitoring a trailer sensor and a lock sensor. The trailer sensor senses the position of the trailer relative to the trailer hitch assembly and the lock sensor senses the position of the locking mechanism.

In one embodiment, the control circuit masks an output of the lock sensor for a first predetermined stabilization period after the control circuit initially determines that the trailer hitch assembly is properly coupled to the trailer hitch. In another embodiment, the electronic system includes a memory device and an output interface both coupled to the control circuit. The memory device stores coupling status information that includes a history of changes in position of the trailer and the locking mechanism as respectively sensed by the trailer sensor and the lock sensor. The output interface is configured to provide the stored status information to an external device coupled to the output interface responsive to a coupling status information request.

Figure 1A:
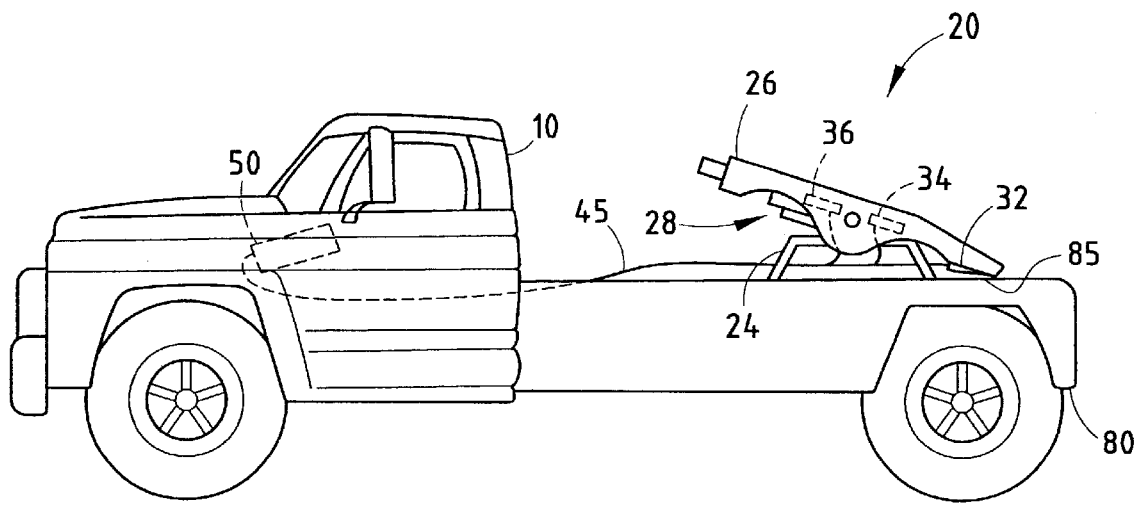
FIG. 1A is a side view of a truck tractor including an electronic system for monitoring a trailer hitch assembly, according to an embodiment of the present invention.

FIG. 1A shows a truck tractor 10 which includes a trailer hitch assembly 20 having a base 24 securely mounted to a chassis 80, a trailer hitch plate 26 pivotally mounted on base 24 on a transverse axis and a locking mechanism 28 for locking a conventional trailer kingpin in place. The electronic system of the present invention preferably includes three proximity sensors mounted to hitch assembly 20 and an output device 50 mounted in the cab of tractor 10. The sensors are coupled to the output device 50 by a multi-conductor cable 45. In a preferred embodiment, the three sensors mounted to trailer hitch assembly 20 include a tilt sensor 32, a kingpin sensor 34 and a lock sensor 36.

Figure 1B:
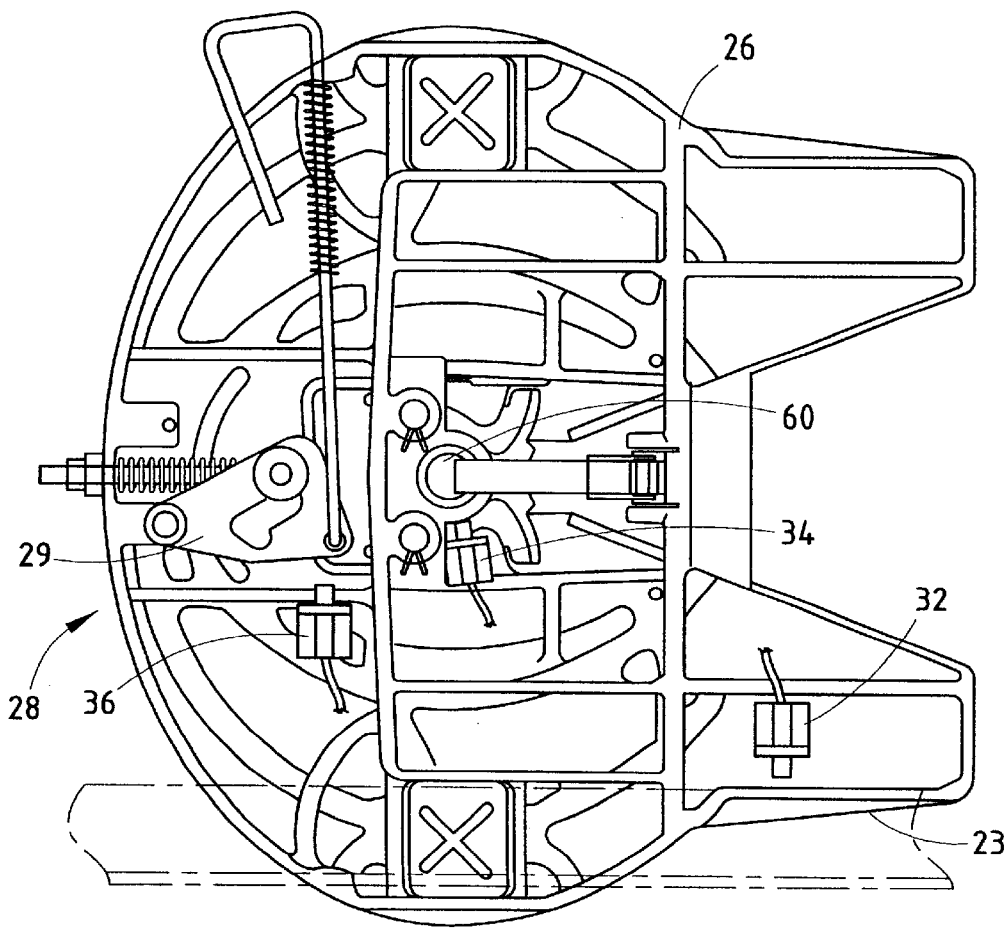
FIG. 1B is a bottom view of the trailer hitch assembly of FIG. 1A.

FIGS. 1B–1D provide more detailed views of the trailer hitch assembly 20 of FIG. 1A. In a preferred embodiment, the tilt sensor 32 is mounted on a flange 23 of the hitch plate 26 such that a sensing end faces outward in a direction perpendicular to pivot pins 21. FIG. 1C shows the hitch plate 26 from the side in combination with the base 24 in a coupled horizontal position 25 and in an uncoupled at rest position 27 (dashed lines). By mounting a metal plate 85 on the chassis 80 in a position near where the sensing end of the tilt sensor 32 is positioned when the trailer hitch plate 26 is in the resting position, the tilt sensor 32 detects the presence of the plate 85 as a basis for determining that the hitch plate 26 is tilted or at a rest position. When the tractor 10 is backed under a trailer, contact is made between the tilted hitch plate 26 and a portion of the trailer. This contact causes hitch plate 26 to rotate into a coupled (horizontal) position. When the tilt sensor 32 subsequently detects the absence of the plate 85, it can be concluded that the hitch plate 26 has been moved from its rest position and the trailer is in proximity to the hitch assembly 20. Alternatively, the sensor 32 may be mounted so as to detect metal when the hitch plate 26 is in the horizontal coupled position.

FIG. 1B shows the kingpin sensor 34 mounted to the hitch plate 26 with a sensing end near the throat 60 formed in the hitch plate 26, into which a trailer kingpin 70 is positioned and locked. FIG. 1D provides an upside-down side view and partial cross-section illustrating the location of the trailer kingpin 70 when properly disposed in the throat 60. As constructed, the kingpin sensor 34 outputs a detection signal when the lower flange of the metal trailer kingpin 70 is disposed in the throat 60, below a lock plane 61. That is, the kingpin sensor 34 is in a plane below locking mechanism 28 and only detects the kingpin 70 when a kingpin rib 62 of the kingpin 70 extends below the lock plane 61. The location of the kingpin sensor 34 prevents it from indicating that the kingpin 70 is present when a high coupling occurs, which prevents the locking mechanism 28 from securing the kingpin 70 (i.e., the trailer) to the hitch assembly 20. The locking mechanism 28, of the hitch assembly 20, is biased by a compression spring to automatically lock-in and secure the trailer kingpin 70, as soon as it enters the hitch throat 60.

FIG. 1B shows the lock sensor 36 mounted to the hitch plate 26 such that a sensing end is in a position proximate to a position of that of a metal cam plate 29 (of the locking mechanism 28) when in a locked position. In this manner, the lock sensor 36 detects the presence of the cam plate 29 as a basis for detecting if the locking mechanism 28 is in a locked and secured position. Those of ordinary skill in the art will appreciate that the present invention may be used in connection with any type of locking mechanism. It should also be noted that the present invention may be applied to trailer hitch assemblies having other constructions and is not limited to the particular mounting locations shown for the sensors 32, 34 and 36.

Figure 1E:
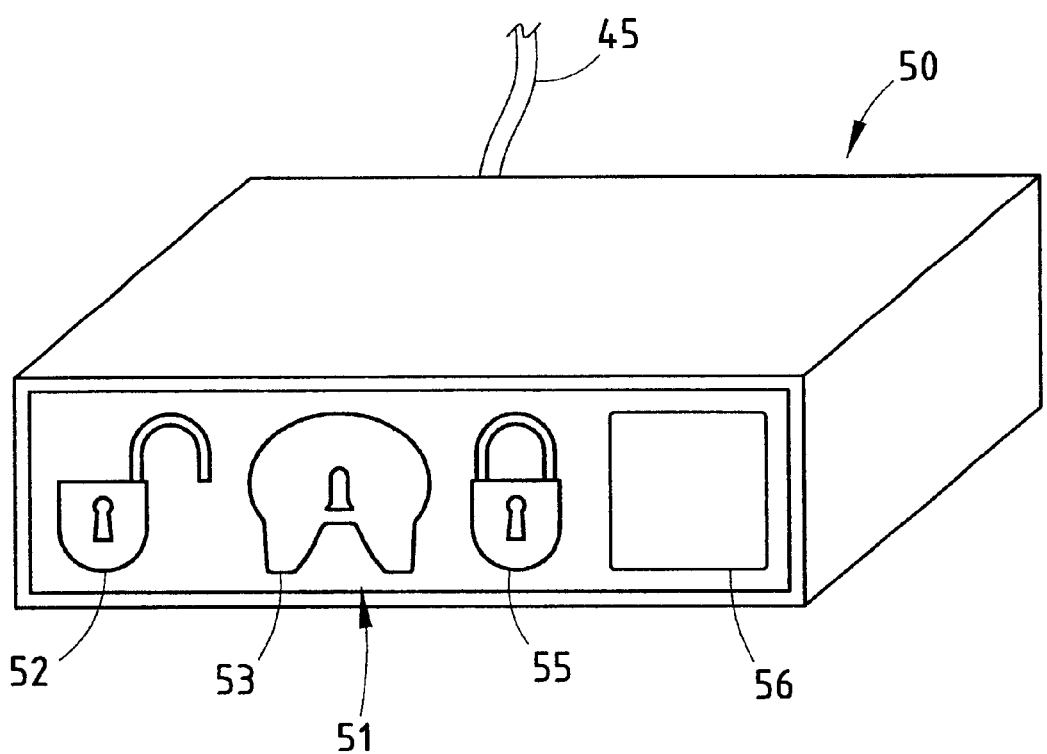
FIG. 1E is an isometric view of an output device for providing coupling status information to a driver of the truck tractor of FIG. 1A.

FIG. 1E illustrates an exemplary output device 50. Multi-conductor cable 45 couples the sensors 32, 34 and 36 to the output device 50. The internal components (i.e., the control circuitry) of the output device 50 are further shown in FIG. 1F. The output device 50 includes a display panel 51 for providing coupling status information to a driver of the tractor 10. In a preferred embodiment, the display panel 51 includes an 'unlocked' icon 52, a 'locked' icon 55, a 'fifth wheel' icon 53 and a seven segment display 56. In a preferred embodiment, the display 56 provides an error code indicating possible sources of a coupling malfunction. Alternatively, the display may be provided in a truck mirror as is disclosed in commonly assigned U.S. patent application Ser. No. 09/836,796, entitled "Truck Rearview Mirror Assembly Having a Display for Displaying Trailer Coupling Status Information," filed on Apr. 17, 2001, the entire disclosure of which is hereby incorporated herein by reference.

Preferably, a red light emitting diode (LED) is provided behind the 'unlocked' icon 52 (i.e., a red unlock indicator). A yellow, a red and a green LED are preferably provided behind the 'fifth wheel' icon 53 (i.e., a yellow, red and green fifth wheel indicator) and a green LED is preferably provided behind the 'lock' icon 55 (i.e., a green lock indicator). One of ordinary skill in the art will appreciate that the individual LEDs could be replaced with an LED array capable of providing multiple colors. While the output device 50, as shown, only includes visual indicators, it should be appreciated that an audio output can be provided. For example, by adding a speaker and appropriate voice processing circuitry, the output device 50 can provide voice output to instruct a driver as to possible causes of a coupling malfunction. Additionally, a warning buzzer may be activated in addition to, or as an alternative to, providing an unlocked icon 52.

Figure 1F:
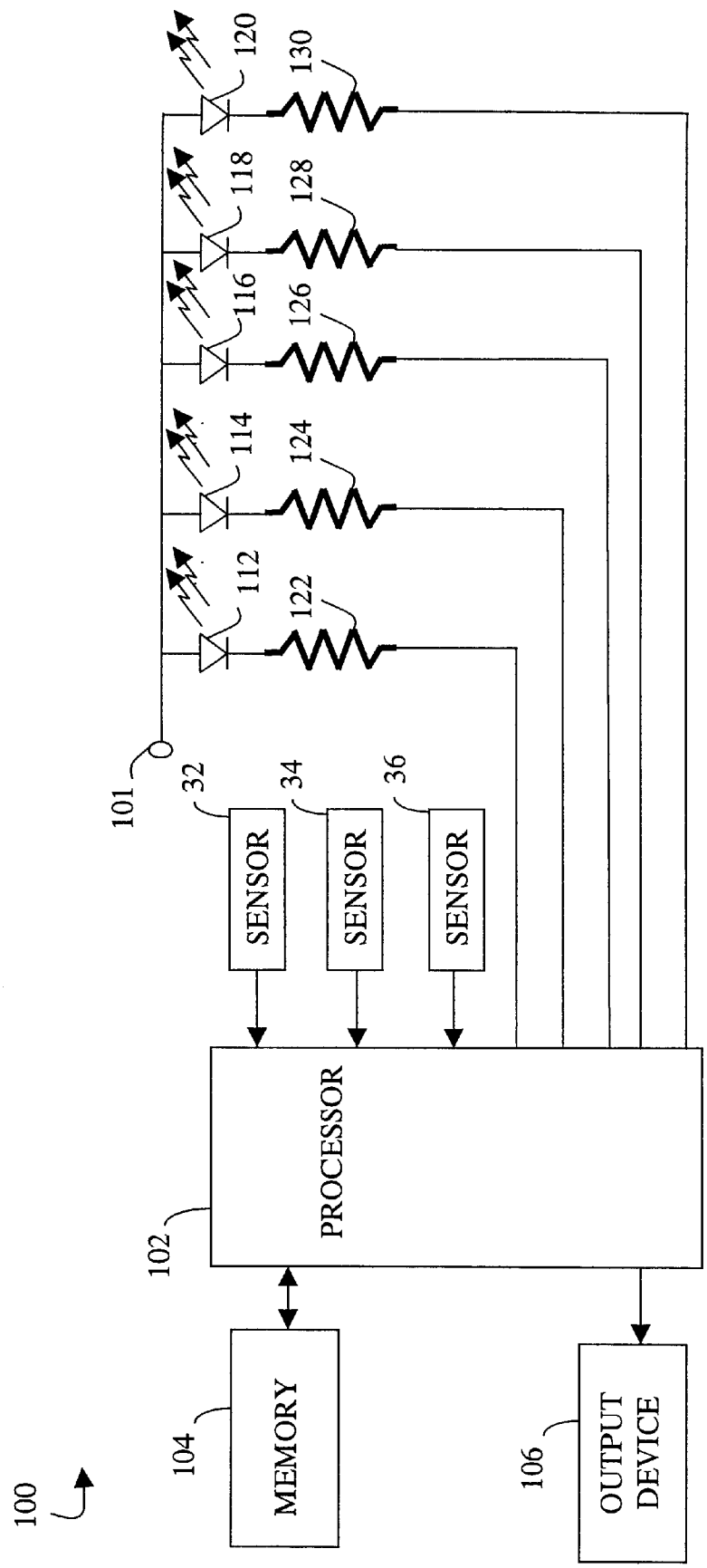
FIG. 1F is an electrical diagram in block and schematic form of an electronic system for monitoring the trailer hitch assembly of FIG. 1A, according to an embodiment of the present invention.

FIG. 1F depicts a block diagram of an electronic system 100, according to an embodiment of the present invention. The electronic system 100 includes a processor 102 that receives input from the sensors 32, 34 and 36. The processor 102 is also coupled to a memory 104 and an output device 106. In a preferred embodiment, the processor 102 is a PIC16C62, manufactured by Microchip Technology Inc. of Chandler, Ariz. A plurality of outputs of the processor 102 are coupled through current limiting resistors 122, 124, 126, 128 and 130 to light emitting diodes (LEDs) 112, 114, 116, 118 and 120 (associated with the icons 52, 53 and 55), respectively. The processor 102 runs a routine that, depending upon the input from the sensors 32, 34 and 36, may cause an error code to appear on output device 106 and may cause different ones or combinations of the LEDs 112–120 to be illuminated.

Preferably, the memory 104 includes an application appropriate amount of electrically erasable programmable read-only memory (EEPROM) that enables the processor 102 to store a history of changes in position of a trailer and a locking mechanism, as respectively sensed by a trailer sensor and a lock sensor. For example, sequences of changes in sensor status may be stored in first-in, first-out (FIFO) manner. Such information is useful for determining whether an accidental uncoupling occurred due to an unexpected mechanical error or if the driver had neglected to pay attention to prior error codes. This information may also be useful when training truck drivers on proper coupling. In a preferred embodiment, the memory 104 is a 24C08 manufactured and made commercially available by Microchip Technology Inc., and is coupled to the processor 102 such that the sensor data stored within it can be readily retrieved by coupling it to an external device, e.g., a personal computer system via an output interface. Depending upon the application, tilt sensor 32 may not be implemented. In a preferred embodiment, output device 106 is a seven segment display. In normal operation, a positive voltage is applied at terminal 101 to allow the LEDs 112–120 to emit light, as dictated by the processor 102.

FIGS. 2A–2G' are a flow chart of an exemplary routine 200 that runs on the processor 102 and allows the processor 102 to determine whether the trailer hitch assembly 20 is properly coupled to a trailer. This is accomplished, in part, by taking into account the sequence in which the kingpin sensor 34 and the lock sensor 36 sense the respective positions of a trailer kingpin 70 and a locking mechanism 28, as well as, a time period elapsing between the sensing of such positions. Table 1, provided below, lists error codes and troubleshooting information that corresponds to the routine 200, of FIGS. 2A–2G'. The routine 200 is initiated when the vehicle is started (step 202). Because the control circuit 100 printed circuit board (PCB) receives power from the vehicle ignition, when the vehicle is not running power is not supplied to the PCB. Thus, so long as the vehicle is running, power is applied to the PCB (step 210). Next, in step 212, the "attempt" variable, which tracks the number of times a coupling has been attempted without success, is set equal to zero. From step 212, control transfers to step 214 where a first timer ('timer') is set equal to zero and the "attempt" variable is incremented, by one. Then, control transfers to step 216 where the first timer is started.

reads the signals supplied by the kingpin sensor 34 and the lock sensor 36 in making this determination. If the kingpin sensor 34 indicates the kingpin is not present and the lock sensor 36 indicates the lock is open, control transfers to step 220. Otherwise, control transfers to step 248 (see FIG. 2C). In step 220, the processor 102, running the routine 200, again determines if there is no kingpin present and the lock is open. If the kingpin sensor 34 indicates the kingpin is not present and the lock sensor 36 indicates the lock is open, control transfers to step 224. Otherwise, control transfers to step 232 (see FIG. 2B).

In step 224, the processor 102 determines if the first timer is greater than 1024 seconds. If not, control transfers to step 226 where the processor 102 activates (if it is not already active) the yellow fifth wheel indicator. The yellow indicator advises the driver that the hitch is ready for coupling. If the first timer is greater than 1024 seconds, control transfers to step 228 where the processor 102 deactivates the yellow fifth wheel indicator. This timing sequence insures that the yellow indicator is not illuminated for any extended period, such as when the driver is driving any appreciable distance without a trailer. From steps 226 and 228, control returns to step 220. Thus, as long as the kingpin is not present and the lock is open, control continuously loops from step 220 to step 224 to step 226 (or step 228) and back to step 220, when the vehicle is running. When this condition is no longer true, control transfers from step 220 to step 232.

In step 232 (FIG. 2B), the processor 102 determines if the kingpin is present and the lock is open. If so, control transfers from step 232 to step 234. Otherwise, control transfers to step 316 (FIG. 2G). In step 234, the first timer is set to zero. Next, in step 236, the processor 102 starts the first timer. Then, in step 238, the processor 102 determines

TABLE 1

| ERROR CODE | SENSOR STATUS KP | SENSOR STATUS LOCK | DESCRIPTION | DRIVER INSTRUCTIONS | TECHNICIAN INSTRUCTION/POSSIBLE CAUSES |
|---|---|---|---|---|---|
| 0 | — | — | After ready condition First attempt Any fault | Re-couple following procedure | None |
| 1 | No | Closed | After Start-up | Perform Visual Inspection No Kingpin Re-couple following procedure | Damaged or misadjusted KP sensor Locks closed or Damaged or misadjusted lock sensor |
| 2 | Yes | Open | After Start-up | Perform Visual Inspection Lock Open Re-couple following procedure | Lock not closed Damaged or misadjusted lock sensor Damaged or misadjusted KP sensor Debris in FW throat |
| 3 | | | Not Used | | None |
| 4 | | | Not Used | | None |
| 5 | No | Closed | Second attempt Lock closed prior to kingpin | Perform visual inspection High couple Re-couple following procedure | Damaged or misadjusted KP sensor Attempted high couple and locks skidded closed |
| 6 | No | Open | Second attempt Kingpin disappeared before lock closed | Perform visual inspection Kingpin bounced out Re-couple following procedure | Kingpin bounced out Binding in Fifth wheel |
| 7 | Yes | Open | Too long of a delay between kingpin and lock closing | Perform visual inspection Slow locking Re-couple following procedure | Binding in fifth wheel Damaged or misadjusted lock sensor |
| 8 | No | Closed | Was coupled Lost kingpin Lock still closed | Perform visual inspection Lost kingpin Re-couple following procedure | Damaged or misadjusted kingpin sensor |
| 9 | Yes | Open | Was coupled Lock Opened Kingpin still present | Perform visual inspection Lock open Re-couple following procedure | Part of normal uncoupling procedure Damaged or misadjusted lock sensor |

Figure 2A:
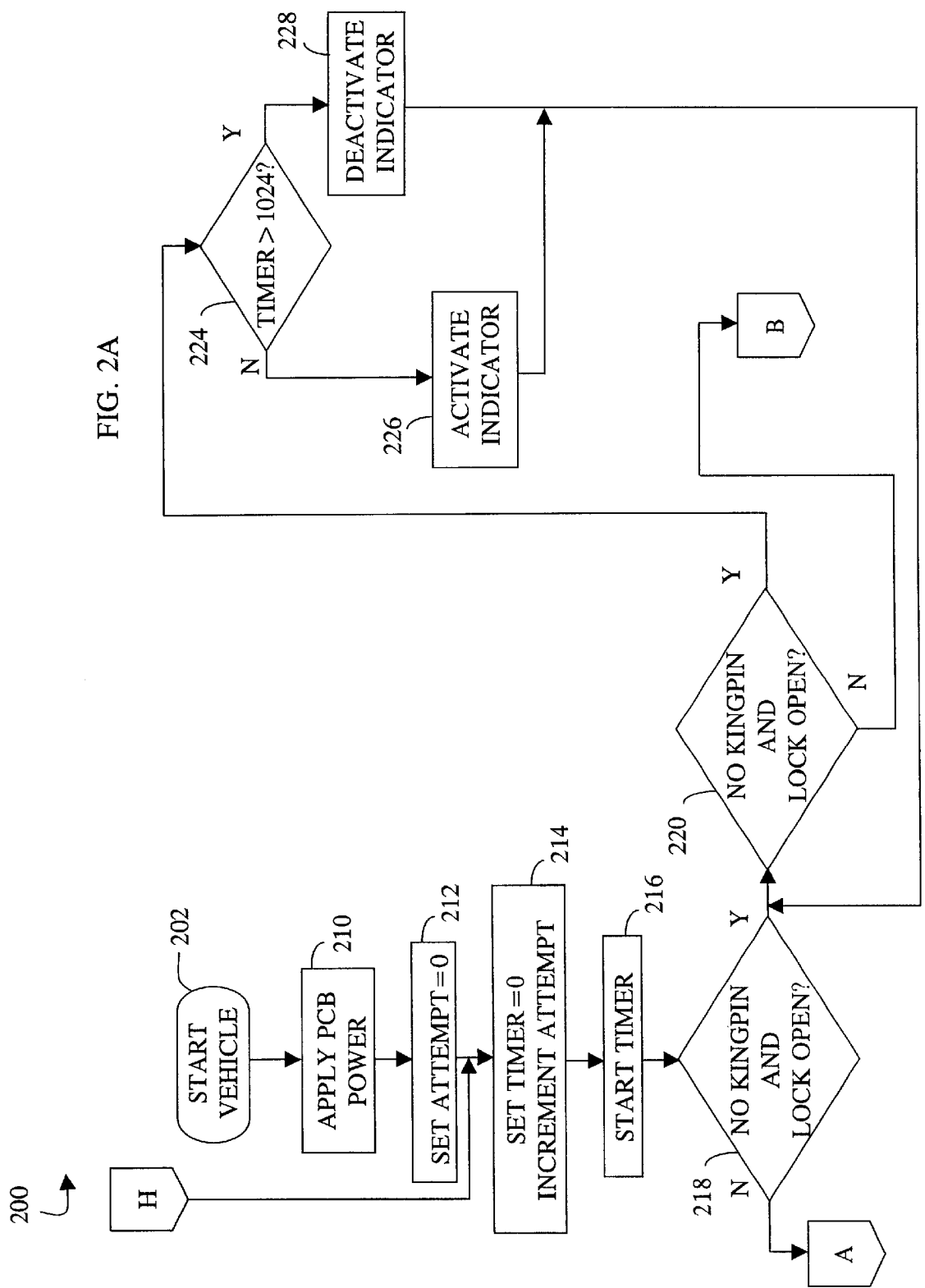
Figure 2C:
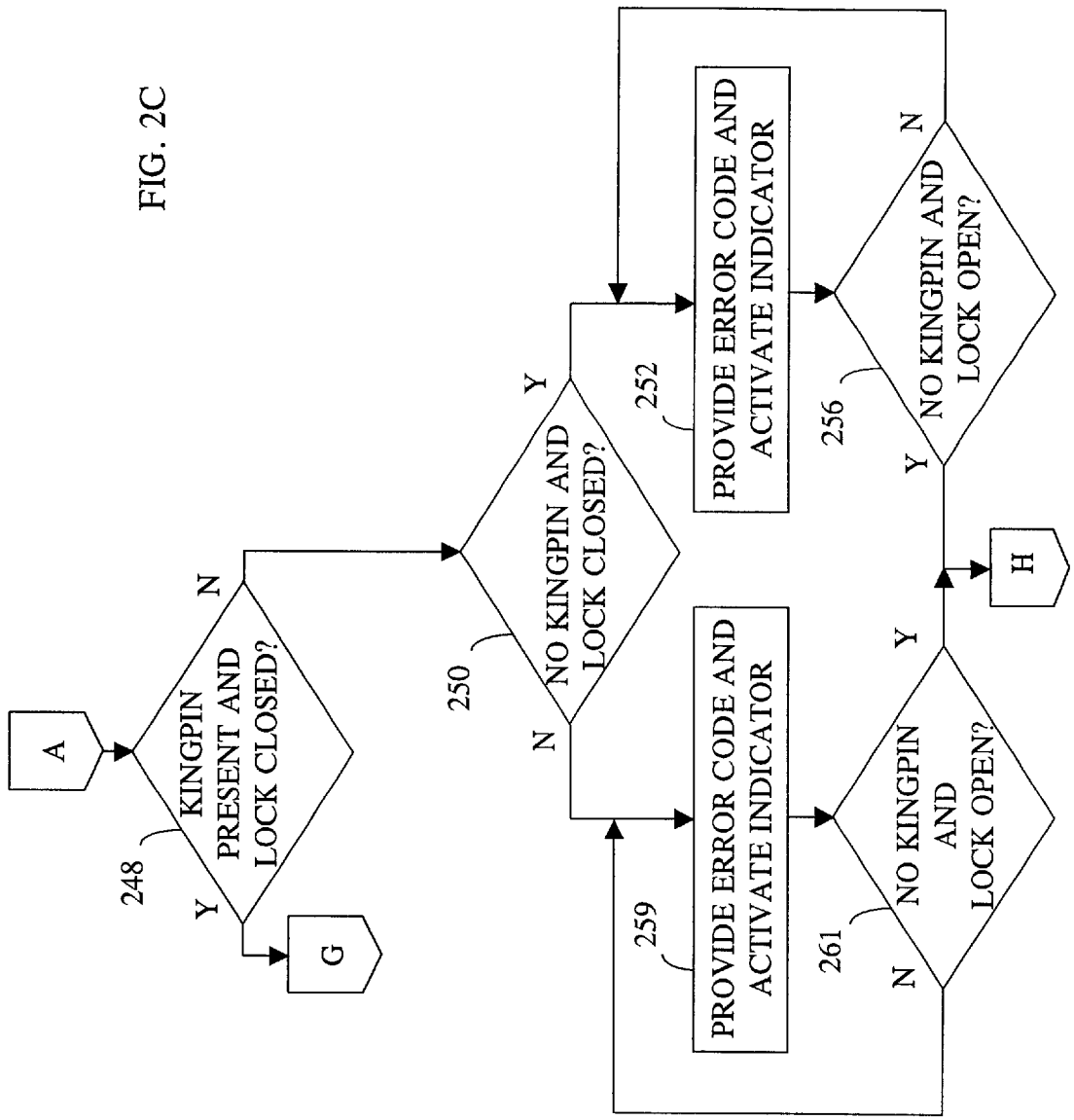
Figure 2E:
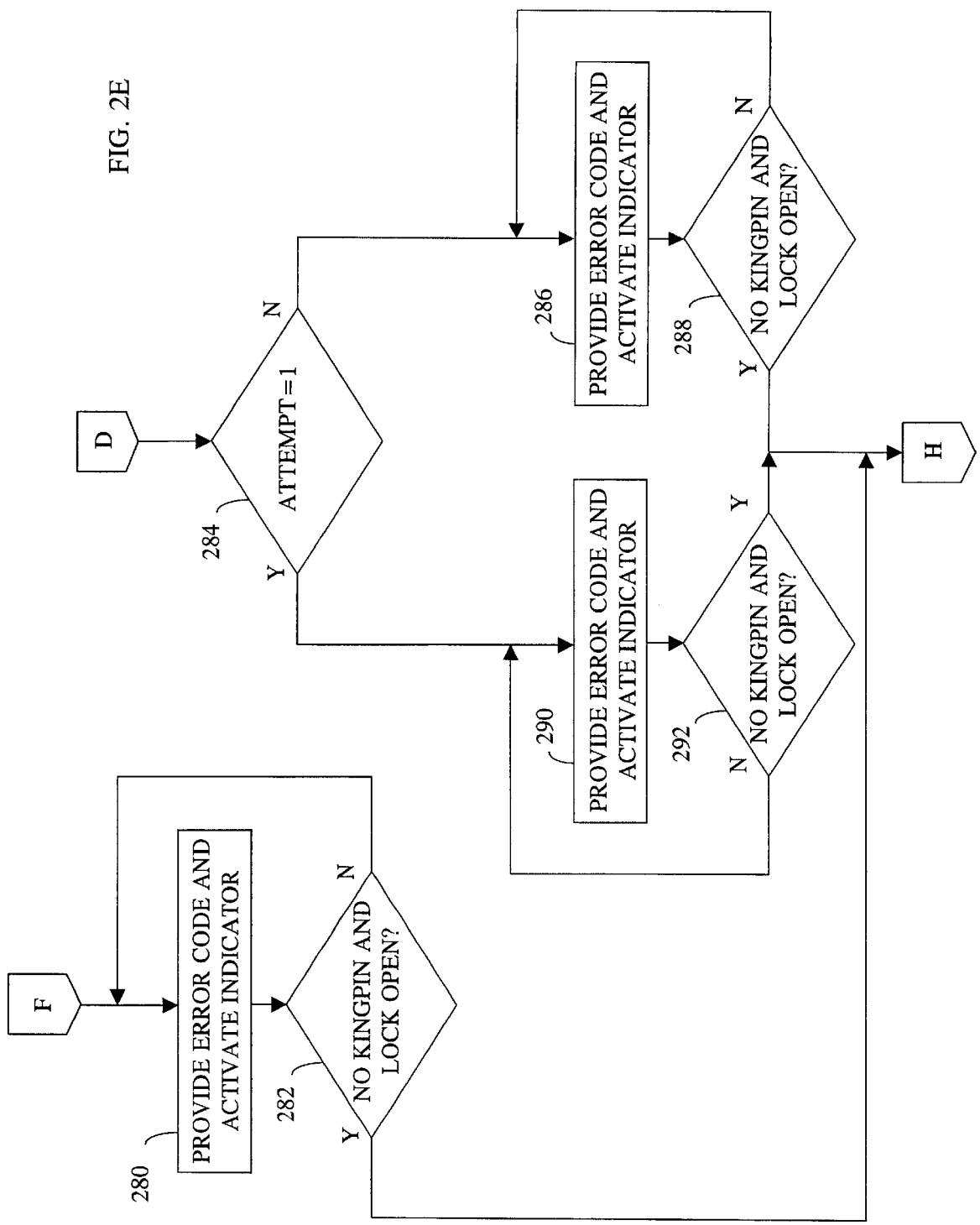

Next, in step 218, the processor 102 determines if there is no kingpin present and the lock is open. The processor 102 if the kingpin is still present and the lock is open. If so, control transfers from step 238 to step 242. Otherwise, control transfers from step 238 to step 246. In step 242, the processor 102 activates (if not already active) the yellow fifth wheel indicator. Next, in step 244, the processor 102 determines whether the first timer is greater than one second. If so, control transfers to step 280 (FIG. 2E). Otherwise, control returns to step 238.

In step 246, the processor 102 determines if the kingpin is present and the lock is closed. If so, control transfers to step 260 (FIG. 2D). Otherwise, control transfers from step 246 to step 284 (FIG. 2E) for error processing. In step 280 (FIG. 2E), the processor 102 provides an appropriate error code (i.e., '7') and activates the red fifth wheel indicator and the red unlock indicator. An error code of '7' indicates that too long of a time period elapsed between the kingpin being present and the lock closing (i.e., more than one second). Next, in step 282, the processor 102 determines if the kingpin is no longer present and the lock is open. So long as the condition is not true, control loops through step 282 and step 280. When the condition is true, control transfers from step 282 to step 214.

In step 284 (FIG. 2E), the processor 102 determines if the "attempt" variable is equal to one. That is, whether more than one unsuccessful attempt has been made to couple the tractor to the trailer. If the "attempt" variable is equal to one, control transfers from step 284 to step 290. Otherwise, control transfers from step 284 to step 286. In step 286, the processor 102 provides an appropriate error code (i.e., '6') and activates the red unlock indicator and the red fifth wheel indicator. An error code of '6' indicates that on a second attempt the kingpin did not appear before the lock closed. Next, in step 288, the processor 102 determines if there is a no kingpin present and the lock is open. If so, control transfers to step 214 (FIG. 2A). Otherwise, returns to step 286.

In step 290, the processor 102 provides an appropriate error code (i.e., '0') and activates the red unlock indicator and may activate the red fifth wheel indicator. An error code of '0' may indicate any error that occurred during a first coupling attempt. At that point, control transfers to step 292 where the processor 102 determines if there is no kingpin present and the lock is open. If so, control transfers to step 214. Otherwise, control returns to step 290.

Step 260 (FIG. 2D), is executed following a determination that the kingpin is present and the lock is closed (step 246 in FIG. 2B). According to a preferred embodiment, the processor 102 is programmed to mask all activity from the lock sensor 36 for a first stabilization period (e.g., 100 ms) after an initial coupled state is detected. The processor 102 may mask an input associated with the sensor 36 by, for example, not monitoring the input associated with the sensor 36 for the first stabilization period. During the first stabilization period, the processor 102 preferably continues to monitor the kingpin sensor 34. This allows the locking cam to physically stabilize from an initial impact of the kingpin 70 during, for example, a high velocity coupling. The processor 102 is also, preferably, programmed such that the outputs provided by the sensors 34 and 36 are considered stable after the signal levels provided by the sensors 34 and 36 have been substantially the same for a second stabilization period (e.g., 6 ms).

In step 260, the processor 102, executing the routine 200, determines if the kingpin is still present and the lock is still closed. If so, control transfers to step 262 where the processor 102 determines if the first timer is greater than sixty seconds. If the first timer is not greater than sixty seconds, control transfers to step 266 where the processor 102 activates (if it is not already active) the green fifth wheel indicator and the green lock indicator to indicate that proper coupling has been accomplished. Next, in step 268, the "attempt" variable is set to zero and the process loops through steps 260–268 until the timer exceeds sixty seconds or the kingpin or lock status changes. If the first timer exceeds sixty seconds, in step 262, control transfers to step 270 where the processor 102 deactivates the green fifth wheel indicator and the green lock indicator. At that point, control transfers to step 260. If either the kingpin is not present or the lock is not closed in step 260, control transfers to step 272. Otherwise, the process continuously loops through steps 260, 262 and 270 when the first timer exceeds sixty seconds.

In step 272, the processor 102 determines if there is no kingpin present and the lock is closed. If so, control transfers from step 272 to step 274. Otherwise, control transfers from step 272 to step 294 (FIG. 2F). In step 294, the processor 102 provides an appropriate error code (i.e., '9') and activates the red unlock indicator and the red fifth wheel indicator. An error code of '9' indicates that kingpin is present, but the lock is open. This would suggest either that the driver is intentionally uncoupling or that the locking mechanism failed. At that point, control transfers to step 296 where the processor 102 determines if there is no kingpin present and the lock is open. If so, control transfers to step 214. Otherwise, control returns to step 294.

In step 274 (FIG. 2D), a second timer is initialized to zero. Next, control transfers to step 275 where the processor 102 starts the second timer. Then, in step 276, the processor 102 determines if the second timer is greater than five seconds. If so, control transfers from step 276 to step 298 (FIG. 2F) to indicate that an uncoupling may have occurred. Otherwise, control transfers from step 276 to step 278 in which the processor 102 determines if the lock is open. If so, the processor 102 determines that either the locking mechanism failed or the driver is intentionally uncoupling the trailer, and thus control transfers to step 302 (FIG. 2F). Otherwise, the processor 102 determines that the kingpin sensor only momentarily stopped sensing the kingpin, as may be the case when driving over a bump in the road, etc., and thus control transfers from step 278 to step 306 (FIG. 2G').

In step 298 (FIG. 2F), the processor 102 provides an appropriate error code (i.e., '8') and activates the red fifth wheel indicator. An error code of '8' indicates that the lock is closed, but the kingpin is not present. At that point, control transfers to step 300 where the processor 102 determines if there is no kingpin present and the lock is open. If so, control transfers to step 214. Otherwise, control returns to step 298.

In step 302 (FIG. 2F), the processor 102 provides an appropriate error code (i.e., '9') and activates the red unlock indicator and the red fifth wheel indicator. An error code of '9' indicates the lock is open. At that point, control transfers to step 304 where the processor 102 determines if there is no kingpin present and the lock is open. If so, control transfers to step 214. Otherwise, control returns to step 302.

In step 306 (FIG. 2G'), the processor 102 determines if the first timer has exceeded sixty seconds. If not, control transfers from step 306 to step 312 where the processor 102 activates (if they are not already active) the green fifth wheel indicator and the green lock indicator. If the first timer has exceeded sixty seconds, control transfers to step 308 where the processor 102 deactivates the green fifth wheel indicator and the green lock indicator. From steps 312 and 308, control transfers to step 314 where the processor 102 determines if the kingpin is present and the lock is closed. If so, control transfers to step 260 (FIG. 2D). Otherwise, control transfers to step 276.

Referring back to FIG. 2C, in step 248, the processor 102 determines if the kingpin is present and the lock is closed. This step follows upon the determination that the kingpin is present and/or the lock is closed following vehicle start-up in step 218 (FIG. 2A). If the kingpin is present and the lock is closed, the processor 102 determines that the truck was started with the trailer already properly coupled and control transfers from step 248 to step 266 to indicate proper coupling. Otherwise, control transfers from step 248 to step 250 in which the processor 102 determines if there is no kingpin present and the lock is closed. If so, control passes to step 252. Otherwise, the processor 102 determines that the lock release may have been pulled while the truck was stopped, and control passes to step 259. In step 259, the processor 102 provides an appropriate error code (i.e., '2') and activates the red unlock indicator and the red fifth wheel indicator. An error code of '2' indicates that while the kingpin is present the lock is open. Next, in step 261, the processor 102 determines if there is a no kingpin present and the lock is open. If so, control transfers to step 214. Otherwise, control transfers returns to step 259.

In step 252, the processor 102 provides an appropriate error code (i.e., '1') and activates the red fifth wheel indicator. An error code of '1' indicates that the kingpin is not present even though the lock is closed. At that point, control transfers to step 256 where the processor 102 determines if there is no kingpin present and the lock is open. If so, control transfers to step 214. Otherwise, control returns to step 252.

In step 316 (FIG. 2G), the processor 102 determines if the "attempt" variable is equal to one. That is, whether more than one unsuccessful attempt has been made to couple the tractor to the trailer. If the "attempt" variable is equal to one, control transfers from step 316 to step 322. Otherwise, control transfers from step 316 to step 318. In step 318, the processor 102 provides an appropriate error code (i.e., '5') and activates the red fifth wheel indicator. An error code of '5' indicates that on a second attempt the lock closed prior to the kingpin being present. Next, in step 320, the processor 102 determines if there is a no kingpin present and the lock is open. If so, control transfers to step 214. Otherwise, control returns to step 318.

In step 322, the processor 102 provides an appropriate error code (i.e., '0') and activates the red fifth wheel indicator and may activate the red unlock indicator. An error code of '0' may indicate any error that occurred during a first coupling attempt. At that point, control transfers to step 324 where the processor 102 determines if there is no kingpin present and the lock is open. If so, control transfers to step 214. Otherwise, control transfers from step 324 to step 322.

Thus, the routine 200 as described above, takes into account the sequence in which a kingpin sensor and a lock sensor sense the respective positions of a trailer kingpin and a locking mechanism, as well as, a time period elapsing between the sensing of such positions.

FIGS. 3A–3J are a flow chart of an exemplary routine 400, that runs on the processor 102, for determining a potential cause of improper coupling by taking in account the sequence in which a tilt sensor, a kingpin sensor and a lock sensor sense the respective positions of the trailer hitch plate, the trailer kingpin and the locking mechanism. In a preferred embodiment, the processor 102 determines which of the routines 200 or 400 to execute by determining whether a routine selecting jumper (not shown) is present on the control circuit PCB. In addition, the time period elapsing between the sensing of the kingpin and the closing of the locking mechanism is tracked. Table 2, provided below, lists error code and troubleshooting information that corresponds to the routine 400 of FIGS. 3A–3J. Like the routine 200, the routine 400 runs on the processor 102, as long as the vehicle is running. A primary difference between the routines 400 and 200 is the consideration of sensor data provided by the tilt sensor 32. When the vehicle is not running, power is removed from the control circuit PCB.

TABLE 2

| ERROR CODE | SENSOR STATUS | | | | | TECH INSTRUCTION/ |
|---|---|---|---|---|---|---|
| | TILT | KINGPIN | LOCK | DESCRIPTION | DRIVER INSTRUCTIONS | POSSIBLE CAUSES |
| 0 | — | — | — | After Ready Condition First attempt Any Fault | Re-couple following procedure | None |
| 1 | Level | No | Open | After Start-up | Perform visual inspection | Damaged or loose tilt sensor |
| | Down | Yes | Closed | | Top plate not oriented properly | Top plate won't tilt down |
| | | | | | Re-couple following procedure | Fifth wheel coupled and tilted |
| 2 | Level | No | Closed | After Start-up | Perform visual inspection | Damaged or loose Kingpin sensor |
| | Down | Yes | Open | | Improper kingpin status | High couple |
| | | | | | Re-couple following procedure | Debris in the throat of the fifth wheel |
| 3 | Level | Yes | Open | After start-up | Perform visual inspection | Damaged or loose lock sensor |
| | Down | No | Closed | | Improper lock status | Binding in the fifth wheel |
| | | | | | Re-couple following procedure | Lock closed or high couple |
| 4 | Down | No | Closed | Second attempt Lock closed prior to kingpin | Perform visual inspection | Damaged or loose KINGPIN sensor |
| | Level | No | Closed | | High couple | Attempted high coupled and locks skidded closed |
| | | | | | Re-couple following procedure | |
| 5 | Down | Yes | Open | Second attempt Kingpin appeared before tilt | Perform visual inspection | Damaged or loose tilt or kingpin sensor |
| | | | | | Top plate did not tilt | Fifth wheel coupled while tilted |
| | | | | | Re-couple following procedure | |
| 6 | Down | Yes | Open | Second attempt | Perform visual inspection | Damaged or loose tilt sensor |
| | Down | Yes | Closed | Top plate tilted down | Top plate tilted down | Top plate titled down during couple |
| | | | | | Re-couple following procedure | |
| 7 | Level | No | Open | Second attempt or after successful couple Kingpin lost | Perform visual inspection | Damaged or loose Kingpin sensor |
| | Level | No | Closed | | Kingpin lost | Kingpin bounced for more than 5 seconds |
| | | | | | Re-couple following procedure | Kingpin bounced out during couple |

TABLE 2-continued

| ERROR CODE | SENSOR STATUS | | | DESCRIPTION | DRIVER INSTRUCTIONS | TECH INSTRUCTION/ POSSIBLE CAUSES |
|---|---|---|---|---|---|---|
| | TILT | KINGPIN | LOCK | | | |
| 8 | Level | Yes | Open | Any attempt Lock did not close within 1 second after Kingpin appeared | Perform visual inspection Lock did not close fast enough Re-couple following procedure | Damaged or loose lock sensor Binding in the fifth wheel lock Debris on or around the kingpin |
| 9 | Level | Yes | Open | Lock opened after successful couple Part of normal uncoupling procedure | Perform visual inspection Lock open Re-couple following procedure | Part of normal uncoupling procedure Damaged or loose sensor |

Figure 3A:
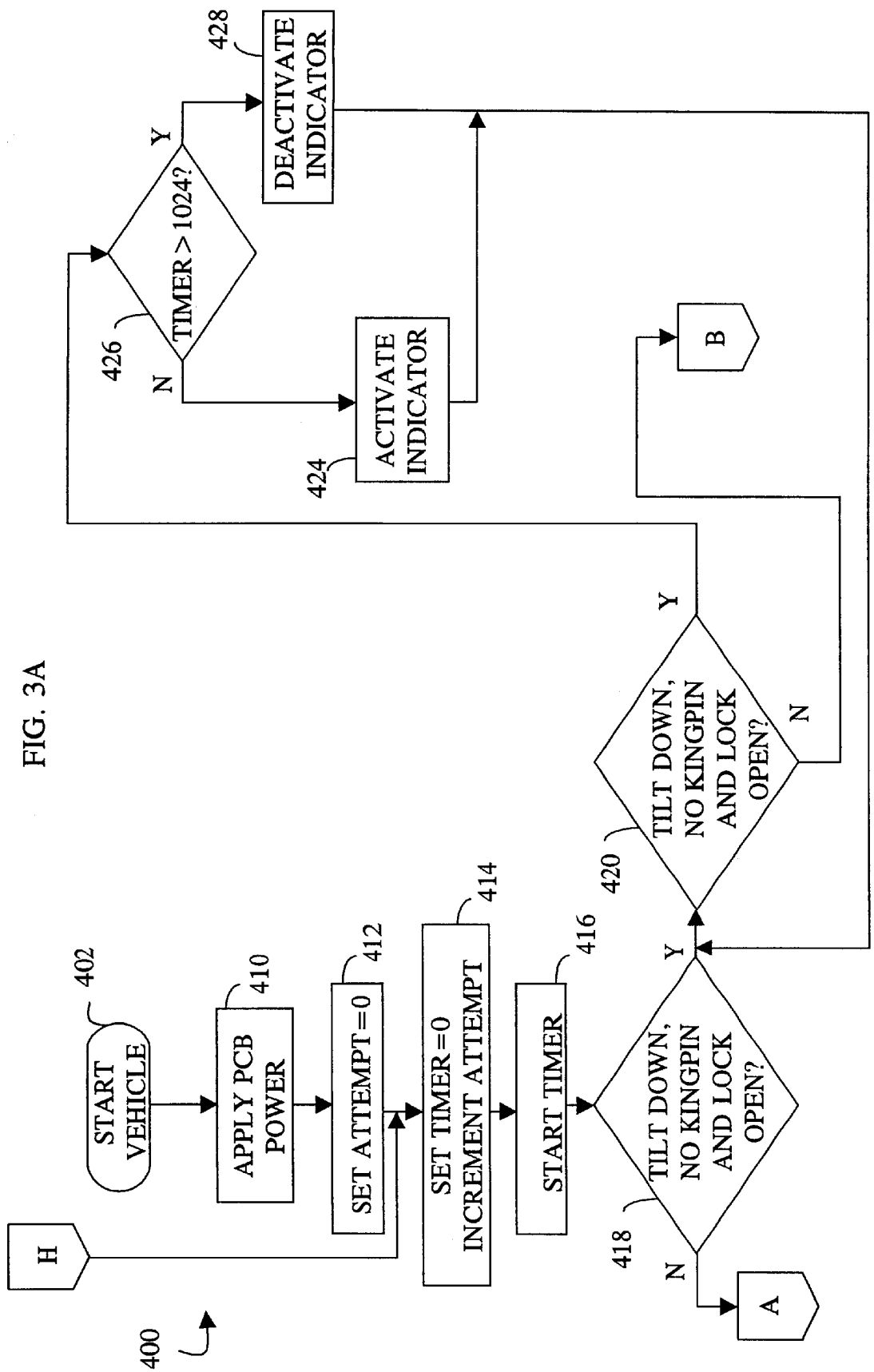
FIGS. 3A–3J are another flow diagram of a routine for determining and displaying coupling status information to a driver of the truck tractor of FIG. 1A, according to another embodiment of the present invention.
Figure 3B:
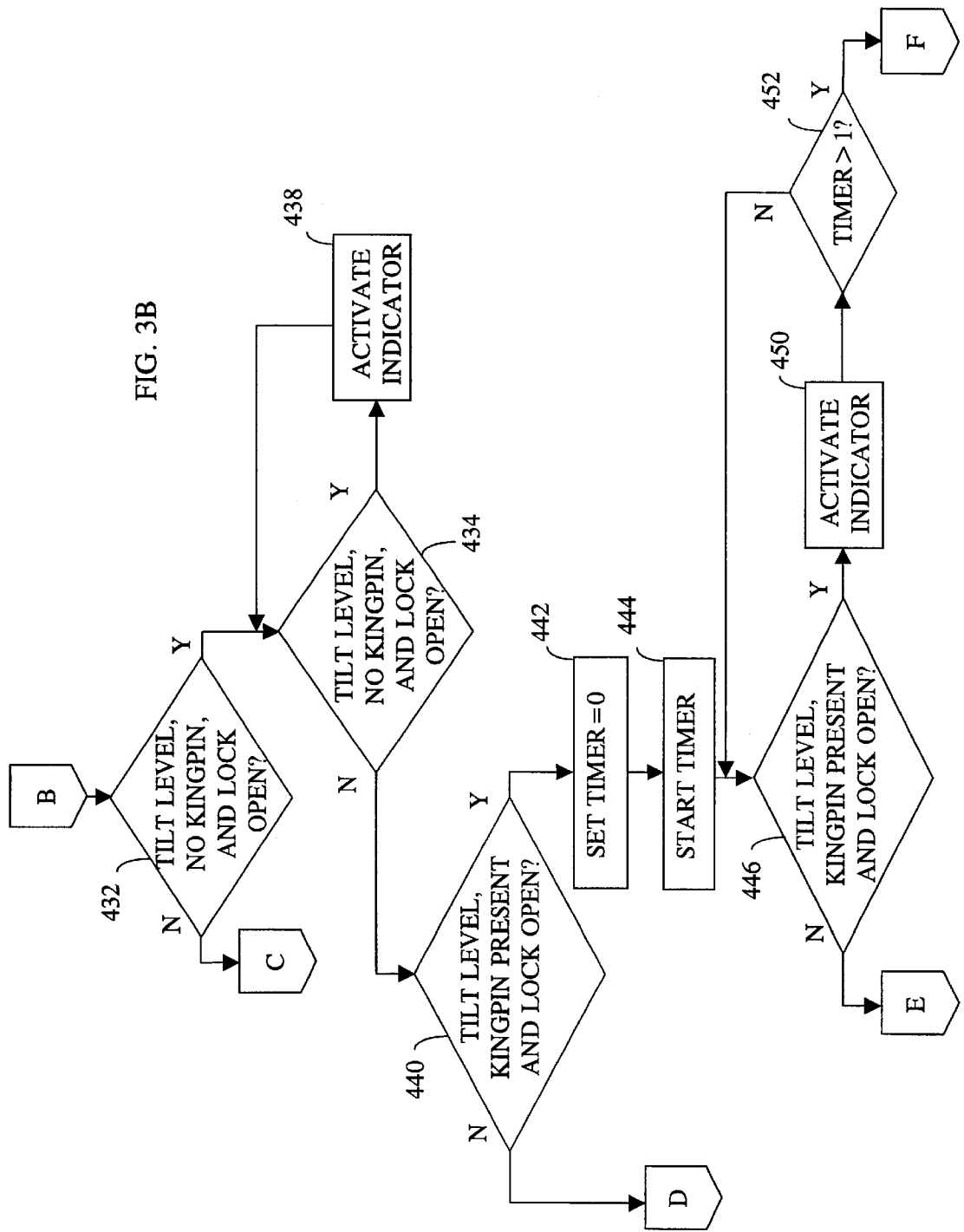
Figure 3C:
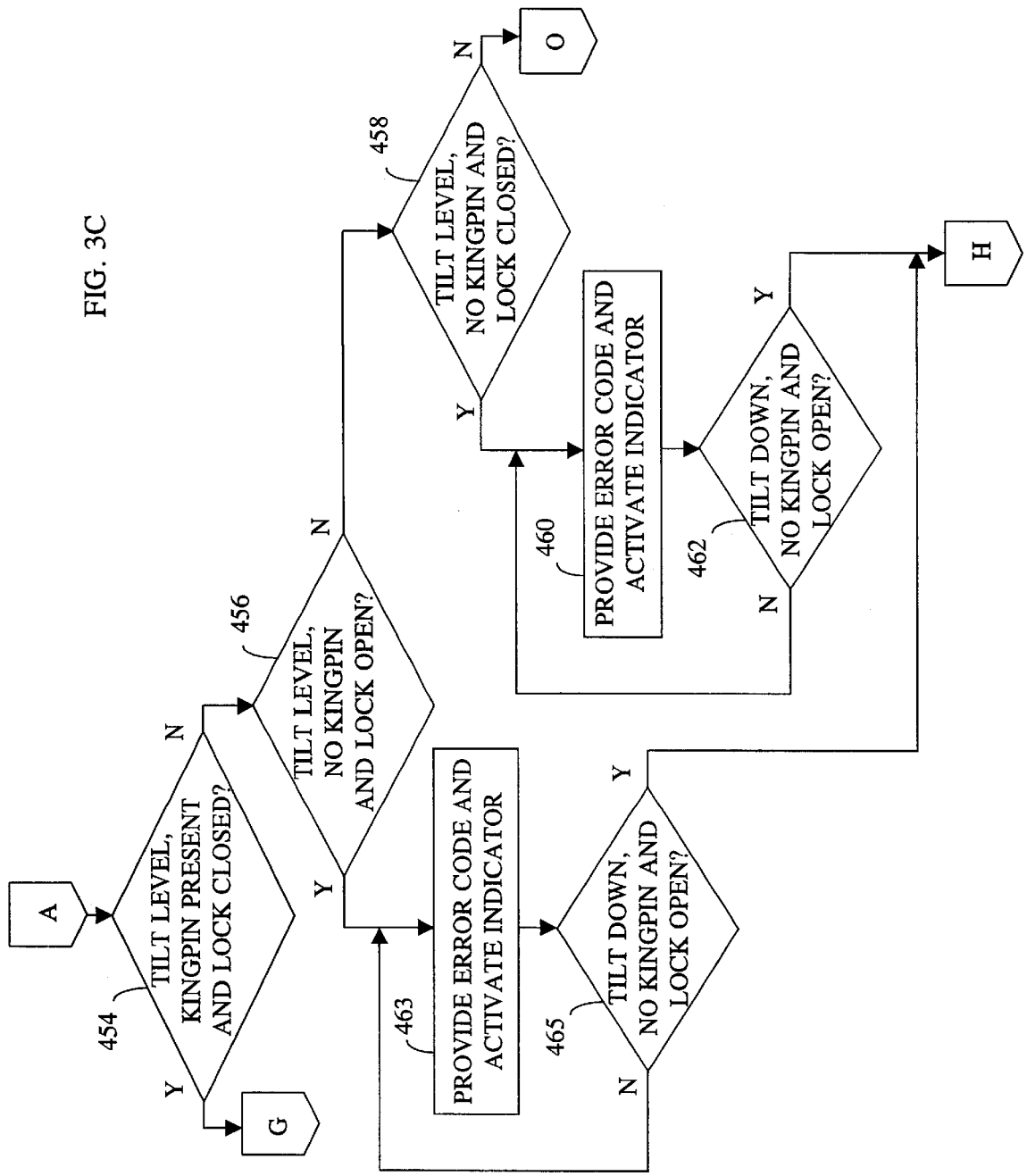

In step 410, when power is applied to the PCB, a boot-up routine is ran by the processor 102. At that point, the routine 400 is executed and control transfers to step 412 where the processor 102, running the routine 400, initializes an "attempt" variable to zero. As above, the "attempt" variable is used to track the number of coupling attempts that have occurred, such that an appropriate error code can be displayed to a driver. Next, in step 414, the processor 102 initializes a first timer to zero and increments, by one, the "attempt" variable. Then, the processor 102 starts the first timer in step 416. Next, in step 418, the processor 102 determines if the tilt is down, there is no kingpin present and the lock is open. The processor 102 determines these conditions by reading the outputs provided by the sensors 32, 34 and 36. If the condition is true, control transfers from step 418 to step 420. Otherwise, control transfers from step 418 to step 454 (FIG. 3C).

In step 420, the processor 102 determines if the tilt is down, there is no kingpin present and the lock is open. If so, control transfers from step 420 to step 426. In step 426, the processor 102 determines if the first timer is greater than 1024 seconds. If not, in step 424, the processor 102 activates (if not already active) the yellow fifth wheel indicator. The yellow indicator advises the driver that the hitch is ready for coupling. Otherwise, control transfers to step 428 where the processor 102 deactivates the yellow fifth wheel indicator. This timing sequence insures that the yellow indicator is not illuminated for any extended period, such as when the driver is driving any appreciable distance without a trailer. From steps 424 and 428, control transfers to step 420. While the tilt is down, there is no kingpin present and the lock is open, the loop from step 420 to step 426 to either step 424 or step 428 and back to step 420 continues, while the vehicle is running. When the condition of the sensors changes such that this condition is no longer satisfied, control transfers from step 420 to step 432 (FIG. 3B).

Figure 3D:
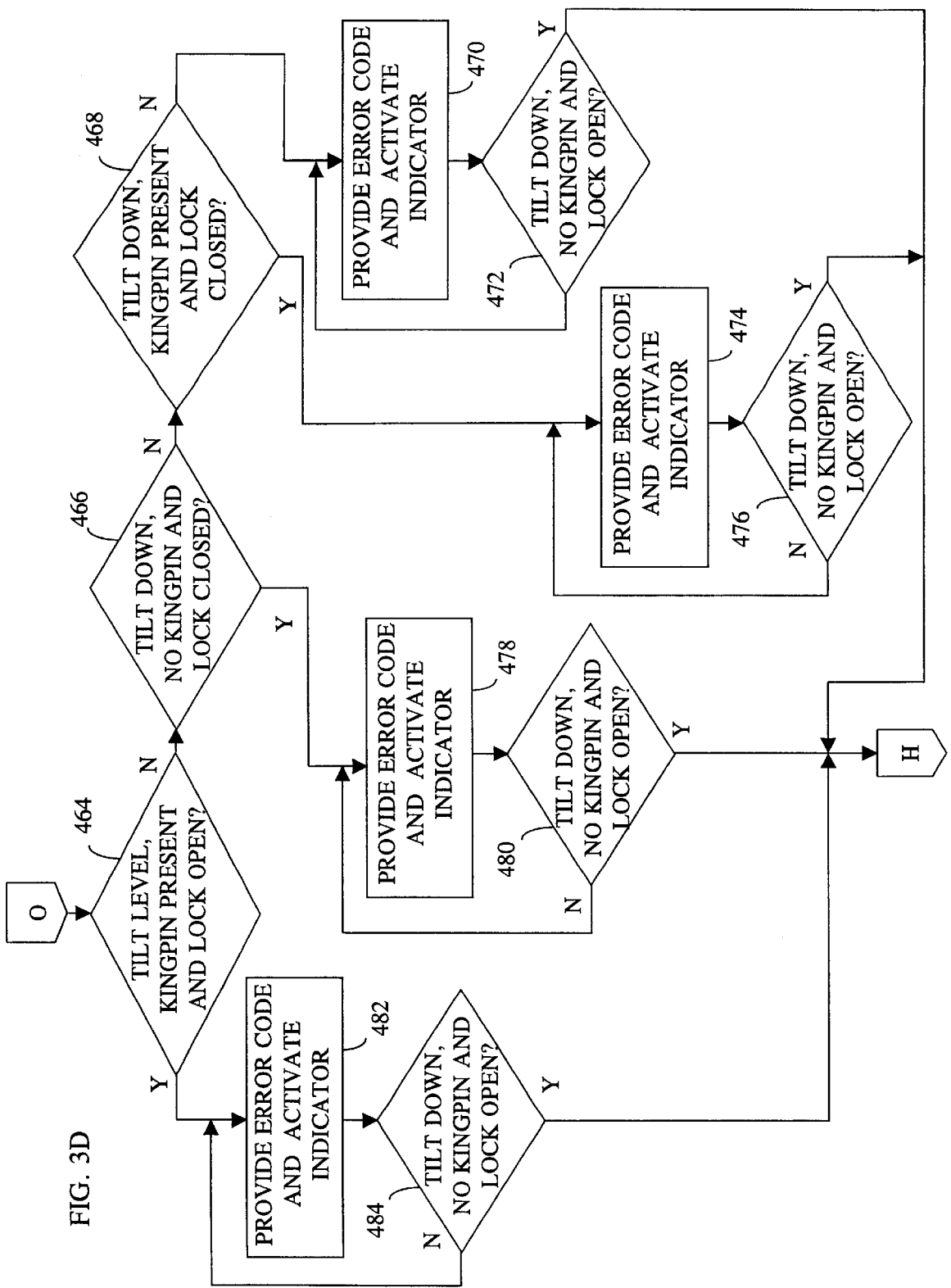
Figure 3E:
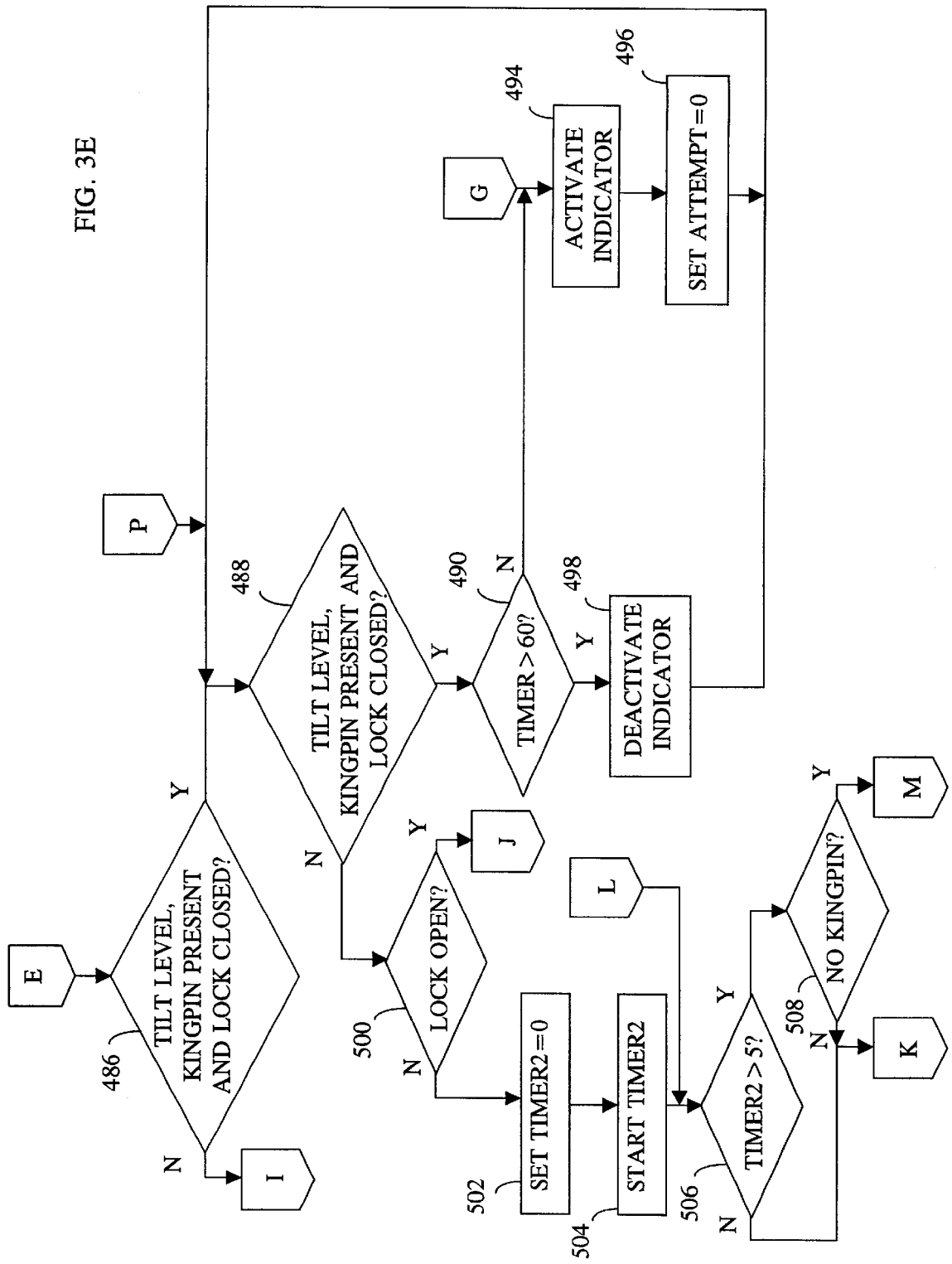
Figure 3F:
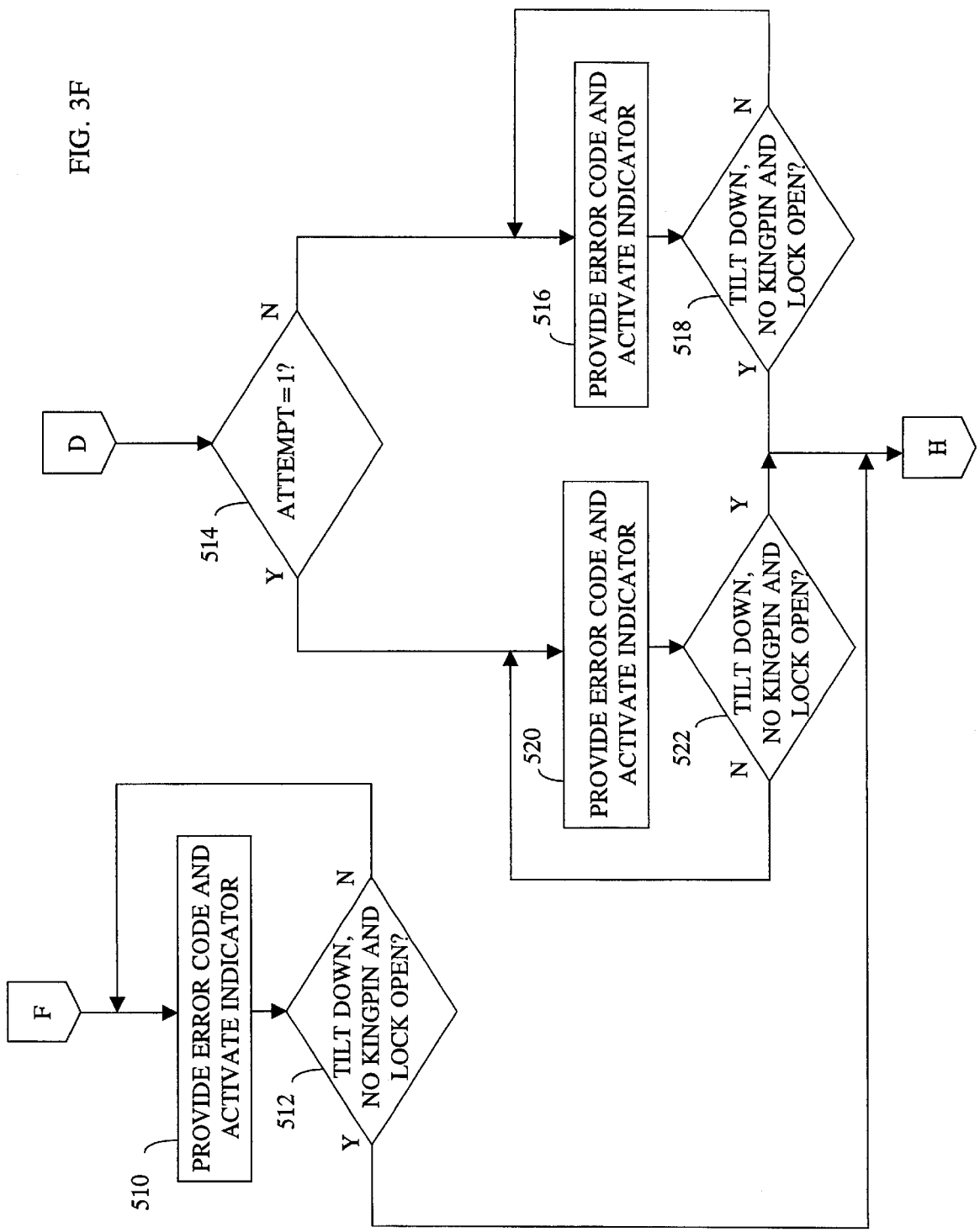
Figure 3G:
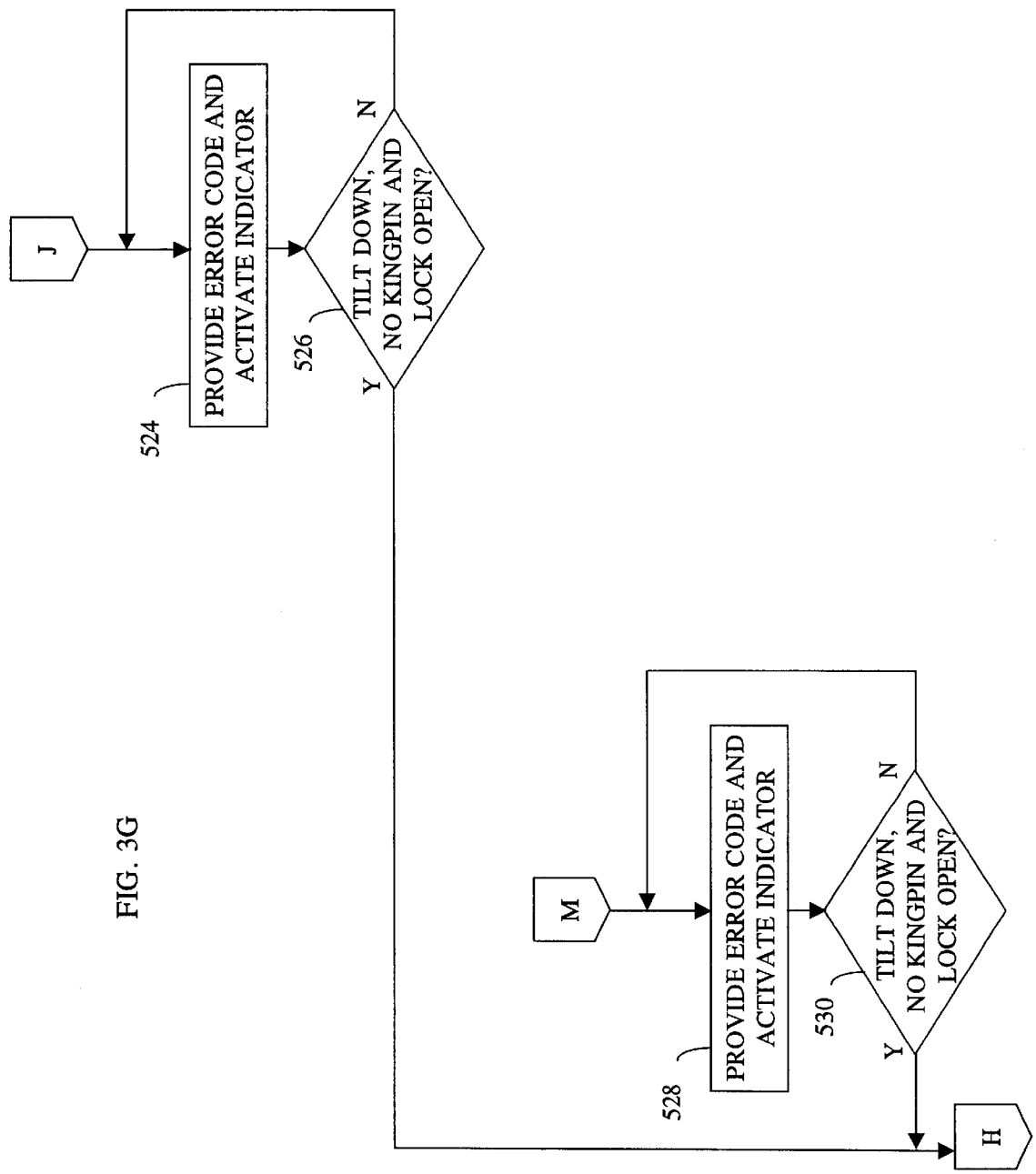
Figure 3H:
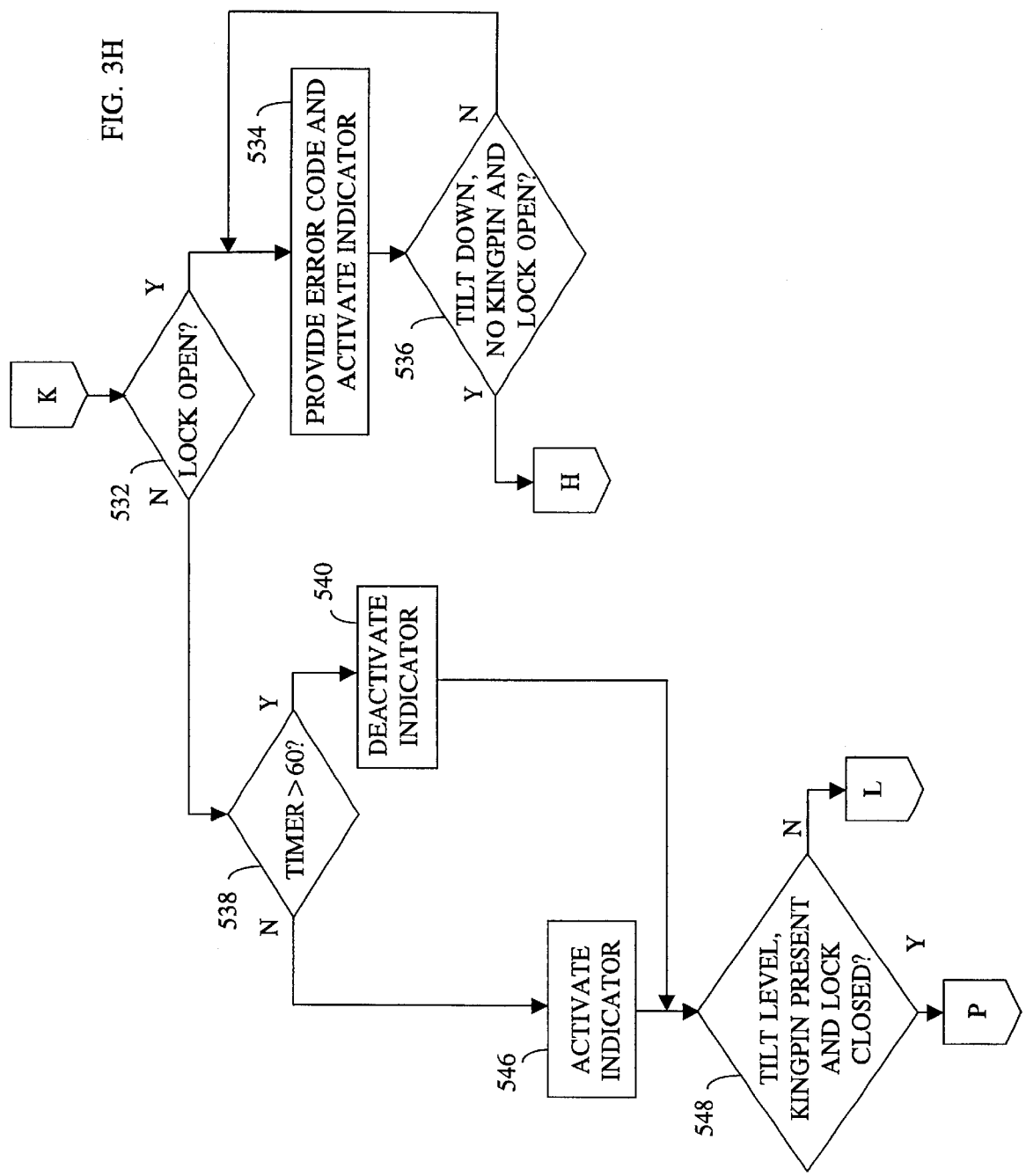
Figure 3I:
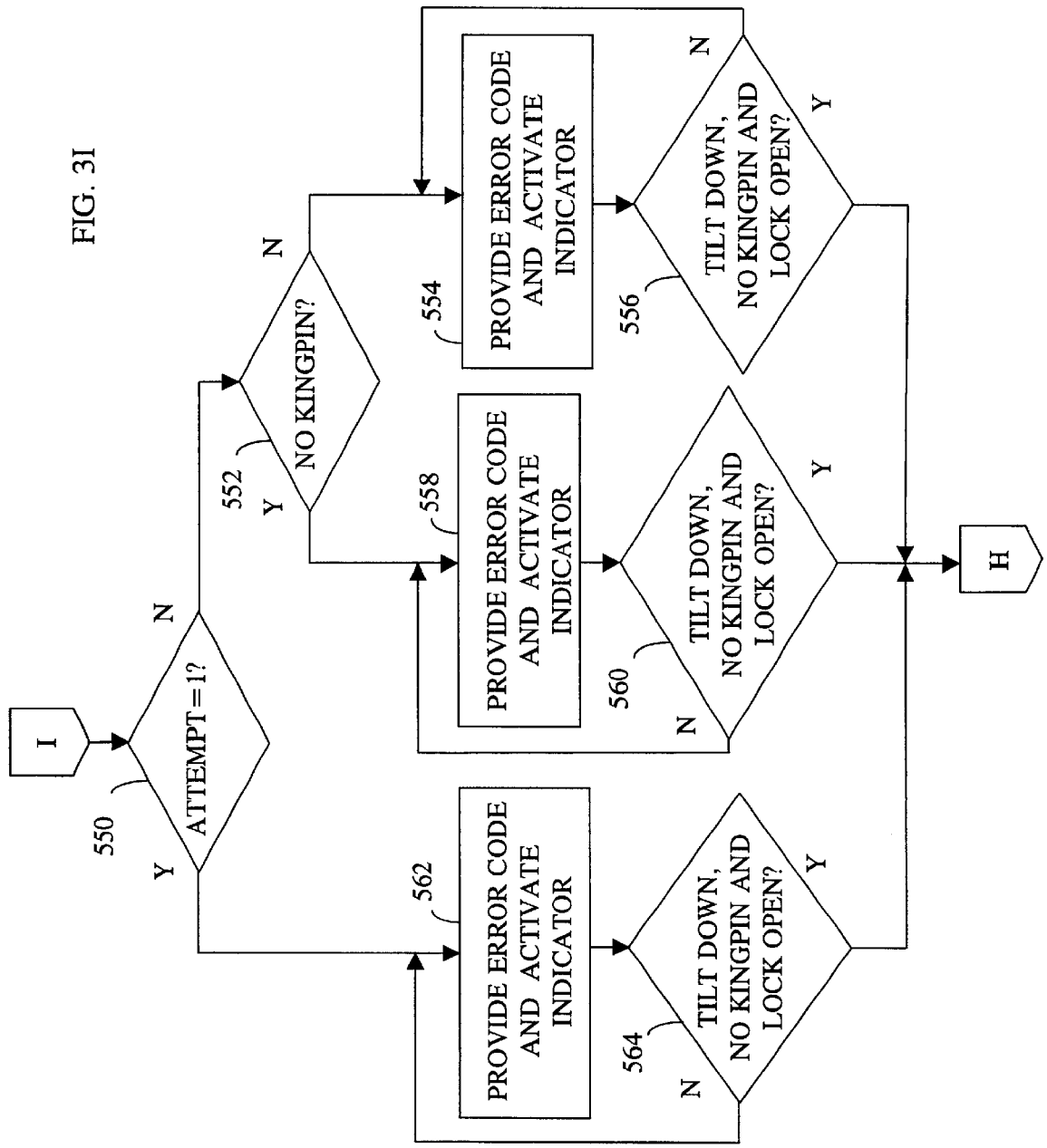
Figure 3J:
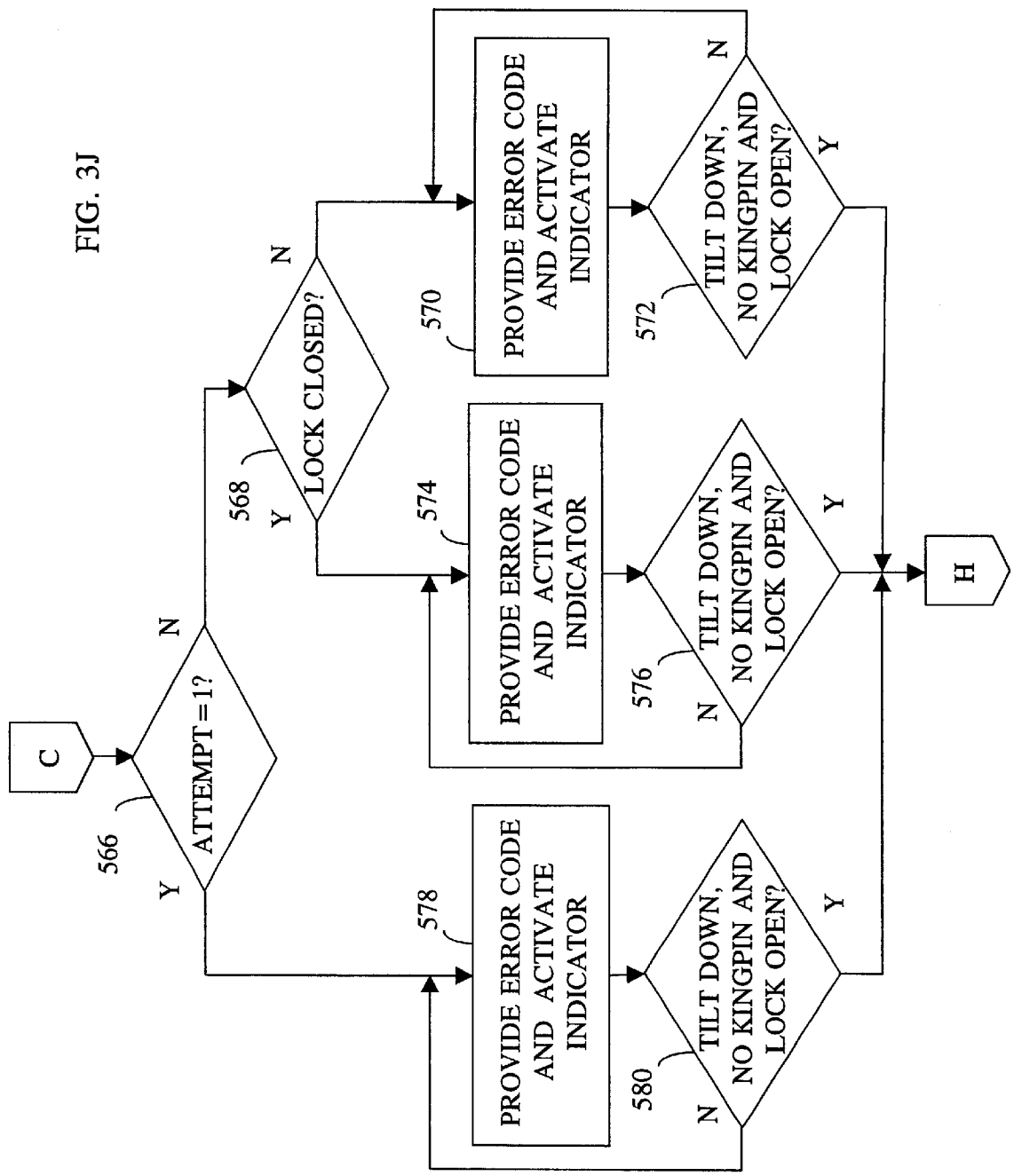

In step 432, the processor 102 determines if the tilt is level, there is no kingpin present and the lock is open. If so, control transfers from step 432 to step 434. Otherwise, control transfers from step 432 to step 566 (FIG. 3J). In step 434, the processor 102 determines if the tilt is level, there is no kingpin present and the lock is open. If not, control transfers to step 440. If the condition is true, control transfers from step 434 to step 438 where the processor 102 activates (if not already active) the yellow fifth wheel indicator. From step 438, control returns to step 434. In step 440, the processor 102 determines if the tilt is level, the kingpin is present and the lock is open. If so, control transfers from step 440 to step 442. Otherwise, control transfers from step 440 to step 514 (FIG. 3F).

In step 442, the processor 102 initializes the first timer. Next, in step 444, the processor 102 starts the first timer. Then, in step 446, the processor 102 determines if the tilt is level, the kingpin is present and the lock is open. If so, control transfers from step 446 to step 450. Otherwise, control transfers from step 446 to step 486 (FIG. 3E). In step 450, the processor 102 activates the yellow fifth wheel indicator, at which point control transfers to step 452. In step 452, the processor 102 determines whether the first timer is greater than one second. If so, control transfers from step 452 to step 510. Otherwise, control transfers from step 452 to step 446.

In step 510 (FIG. 3F), the processor 102 provides an appropriate error code (i.e., '8') and activates the red unlock indicator and the red fifth wheel indicator. An error code of '8' indicates that while the tilt is level and the kingpin is present, the lock did not close within one second. From step 510, control transfers to step 512. In step 512, the processor 102 determines if the tilt is down, there is no kingpin present and the lock is open. If so, control transfers from step 512 to step 414. Otherwise, control returns to step 510.

In step 514, the processor 102 determines if the "attempt" variable is equal to one. That is, if more than one unsuccessful attempt at coupling has already occurred. If the attempt is a first attempt, control transfers from step 514 to step 520. Otherwise, control transfers from step 514 to step 516. In step 516, the processor 102 provides an appropriate error code (i.e., '4') and activates the red fifth wheel indicator. An error code of '4' indicates at a second attempt, the lock closed prior to the kingpin being present. Next, in step 518, the processor 102 determines if the tilt is down, there is no kingpin present and the lock is open. If so, control transfers from step 518 to step 414. Otherwise, control returns to step 516.

In step 520, the processor 102 provides an appropriate error code (i.e., '0') and activates the red fifth wheel indicator and may activate the red unlock indicator. An error code of '0' may indicate any error that occurred during a first coupling attempt. Next, control transfers to step 522 where the processor 102 determines if the tilt is down, there is no kingpin present and the lock is open. If so, control transfers from step 522 to step 414. Otherwise, control transfers from step 522 to step 520.

In step 454 (FIG. 3C), the processor 102 determines if the tilt is level, the kingpin is present and the lock is closed. If so, control transfers from step 454 to step 494 (FIG. 3E). Otherwise, control transfers from step 454 to step 456. In step 456, the processor 102 determines if the tilt is level, there is no kingpin present and the lock is open. If so, control transfers from step 456 to step 463. Otherwise, control transfers from step 456 to step 458. In step 458, the processor 102 determines if the tilt is level, there is no kingpin and the lock is closed. If so, control transfers from step 458 to step 460. Otherwise, control transfers from step 458 to step 464 (FIG. 3D).

In step 460, the processor 102 provides an appropriate error code (i.e., '2') and activates the red fifth wheel indicator and may activate the red unlock indicator. An error code of '2' indicates that while the tilt is level and the lock is closed, the kingpin is not present. Next, control transfers to step 462 where the processor 102 determines if the tilt is down, there is no kingpin present and the lock is open. If so, control transfers from step 462 to step 414. Otherwise, control transfers to step 460.

In step 463, the processor 102 provides an appropriate error code (i.e., '1') and activates the red fifth wheel indicator and may activate the red unlock indicator. Next, in step 465, the processor 102 determines if the tilt is down, there is no kingpin present and the lock is open. If so, control transfers from step 465 to step 414. Otherwise, control returns to step 463.

In step 464, the processor 102 determines if the tilt is level, the kingpin is present and lock is open. If so, control transfers from step 464 to step 482. Otherwise, control transfers from step 464 to step 466. In step 466, the processor 102 determines if the tilt is down, there is no kingpin present and the lock is closed. If so, control transfers to step 478. Otherwise, control transfers to step 468 where the processor 102 determines if the tilt is down, the kingpin is present and the lock is closed. If so, control transfers from step 468 to step 474. Otherwise, control transfers from step 468 to step 470. In step 470, the processor 102 provides an appropriate error code (i.e., '2') and activates the red fifth wheel indicator and may activate the red unlock indicator. Next, in step 470, the processor 102 determines if the tilt is down, there is no kingpin and the lock is open. If so, control transfers to step 414. Otherwise, control returns to step 470.

In step 474, the processor 102 provides an appropriate error code (i.e., '1') and activates the red fifth wheel indicator and may activate the red unlock indicator. From step 474, control transfers to step 476 where the processor 102 determines if the tilt is down, there is no kingpin present and the lock is open. If so, control transfers from step 476 to step 414. Otherwise, control transfers from step 476 to step 474.

In step 478, the processor 102 also provides an appropriate error code (i.e., '3') and activates the red fifth wheel indicator and may activate the red unlock indicator. Next, in step 480, the processor 102 determines if the tilt is down, there is no kingpin present and the lock is open. If so, control transfers from step 480 to step 414. Otherwise, control returns to step 478. Likewise, in step 482, the processor 102 provides an appropriate error code (i.e., '3') and activates the red fifth wheel indicator and may activate the red unlock indicator. Next, in step 484, the processor 102 determines if the tilt is down, there is no kingpin and the lock is open. If so, control transfers from step 484 to step 414. Otherwise, control returns to step 482.

In step 486 (FIG. 3E), the processor 102 determines if the tilt is level, the kingpin is present and the lock is closed. If so, control transfers from step 486 to step 488. Otherwise, control transfers to step 550 (FIG. 3I). In step 488, the processor 102 determines if the tilt is still level, the kingpin is still present and the lock is still closed. If so, control transfers from step 488 to step 490. Otherwise, control transfers to step 500. In step 490, the processor 102 determines if the first timer is greater than sixty seconds. If so, control transfers to step 498. Otherwise, control transfers from step 490 to step 494. In step 494, the processor 102 activates (if not already active) the green lock indicator and the green fifth wheel indicator to indicate that proper coupling has been accomplished, at which point control transfers to step 496. In step 496, the processor 102 initializes the "attempt" variable to zero and the process loops to step 488 until the timer exceeds sixty seconds or the tilt, kingpin or lock status changes.

According to a preferred embodiment, the processor 102 is programmed to mask all activity from the lock sensor 36 for a first stabilization period (e.g., 100 ms) after an initial coupled state is detected. During the first stabilization period, the processor 102 continues to monitor the sensors 32 and 34. Masking the lock sensor 36 for the first stabilization period allows the locking cam to physically stabilize from an initial impact of the kingpin 70 during, for example, a high velocity coupling. The processor 102 is also, preferably, programmed such that the outputs provided by the sensors 32, 34 and 36 are considered stable after signal levels provided by the sensors 32, 34 and 36 have been substantially the same for a second stabilization period (e.g., 6 ms). In step 498, after the timer exceeds sixty seconds, the processor 102 deactivates the green lock indicator and the green fifth wheel indicator, at which point control transfers to step 488.

In step 500, the processor 102 determines if the lock is open. If so, control transfers to step 524 (FIG. 3G). Otherwise, control transfers to step 502. In step 502, the processor 102 initializes a second timer to zero. Next, in step 504, the processor 102 starts the second timer. Then, in step 506, the processor 102 determines whether the second timer is greater than five seconds. If so, control transfers to step 508. Otherwise, control transfers to step 532 (FIG. 3H). In step 508, the processor 102 determines if there is no kingpin present. If so, control transfers to step 528. Otherwise, control transfers from step 508 to step 532.

In step 528, the processor 102 provides an appropriate error code (i.e., '7') and activates the red fifth wheel indicator and may activate the red unlock indicator. Next, in step 530, the processor 102 determines if the tilt is down, there is no kingpin present and the lock is open. If so, control transfers from step 530 to step 414. Otherwise, control transfers to step 528. In step 524, the processor 102 also provides an appropriate error code (i.e., '9') and activates the red unlock indicator and the red fifth wheel indicator. From that point, control transfers to step 526 where the processor 102 determines if the tilt is down, there is no kingpin present and the lock is open. If so, control transfers from step 526 to step 414. Otherwise, control returns to step 524.

In step 532, the processor 102 determines if the lock is open. If so, control transfers from step 532 to step 534. Otherwise, control transfers to step 538. In step 534, the processor 102 provides an appropriate error code (i.e., '3') and activates the red fifth wheel indicator and may activate the red unlock indicator. Next, in step 536, the processor 102 determines if the tilt is down, there is no kingpin present and the lock is open. If so, control transfers to step 414. Otherwise, control returns to step 534.

In step 538, the processor 102 determines whether the first timer is greater than sixty seconds. If the first timer is not greater than sixty seconds, control transfers to step 546 where the processor 102 activates the green lock indicator and the green fifth wheel indicator. Otherwise, control transfers to step 540 where the processor 102 deactivates the green lock indicator and the green fifth wheel indicator. Next, in step 548, the processor 102 determines if the tilt is level, the kingpin is present and the lock is closed. If so, control transfers to step 488. Otherwise, control transfers to step 506.

In step 550, the processor 102 determines if the attempt at coupling is a first coupling attempt. If so, control transfers from step 550 to step 562. Otherwise, control transfers to step 552. In step 552, the processor 102 determines if there is no kingpin present. If so, control transfers to step 558. If not, control transfers to step 554 where the processor 102 provides an appropriate error code (i.e., '6') and activates the red fifth wheel indicator and may activate the red unlock indicator. An error code of '6' indicates that the hitch plate is not level. Next, control transfers to step 556 where the processor 102 determines if the tilt is down, there is no kingpin and the lock is open. If so, control transfers to step 414. Otherwise, control returns to step 554.

In step 558, the processor 102 provides an appropriate error code (i.e., '7') and activates the red fifth wheel indicator and may activate the red unlock indicator. An error code of '7' indicates that the kingpin is not present. Next, in step 560, the processor 102 determines if the tilt is down, there is no kingpin present and the lock is open. If so, control transfers to step 414. Otherwise, control returns to step 558.

In step 562, the processor 102 provides an appropriate error code (i.e., '0') and activates the red fifth wheel indicator and may activate the red unlock indicator. Next, in step 564, the processor 102 determines if the tilt is down, there is no kingpin present and the lock is open. If so, control transfers to step 414. Otherwise, control transfers from step 564 to step 562.

In step 566, the processor 102 determines if the attempt at coupling is a first coupling attempt. If so, control transfers from step 566 to step 578. Otherwise, control transfers from step 566 to step 568. In step 568, the processor 102 determines if the lock is closed. If so, control transfers from step 568 to step 574. Otherwise, control transfers from step 568 to step 570. In steps 578, 574 and 570, the processor 102 provides an appropriate error code (i.e., '0', '4'and '5', respectively) and activates the red fifth wheel indicator and may activate the red unlock indicator.

From step 578, control transfers to step 580. In step 580, the processor 102 determines if the tilt is down, there is no kingpin present and the lock is open. If so, control transfers to step 414. Otherwise, control returns to step 578. From step 574, control transfers to step 576. In step 576, the processor 102 determines if the tilt is down, there is no kingpin present and the lock is open. If so, control transfers to step 414. Otherwise, control returns to step 574. From step 570, control transfers to step 572. In step 572, the processor 102 determines if the tilt is down, there is no kingpin and the lock is open. If so, control transfers to step 414. Otherwise, control returns to step 570. As previously stated, the routine 400 runs continuously while power is supplied to the control circuit PCB.

Thus, a control circuit and two routines have been described that determine whether the trailer hitch assembly is properly coupled to the trailer by taking into account the sequence in which the trailer sensor and the lock sensor sense the respective positions of the trailer and locking mechanism. The control circuit, preferably, masks an output of the lock sensor for a first predetermined stabilization period after the control circuit initially determines that the trailer hitch assembly is properly coupled to the trailer.

Figures 4A, 4B:
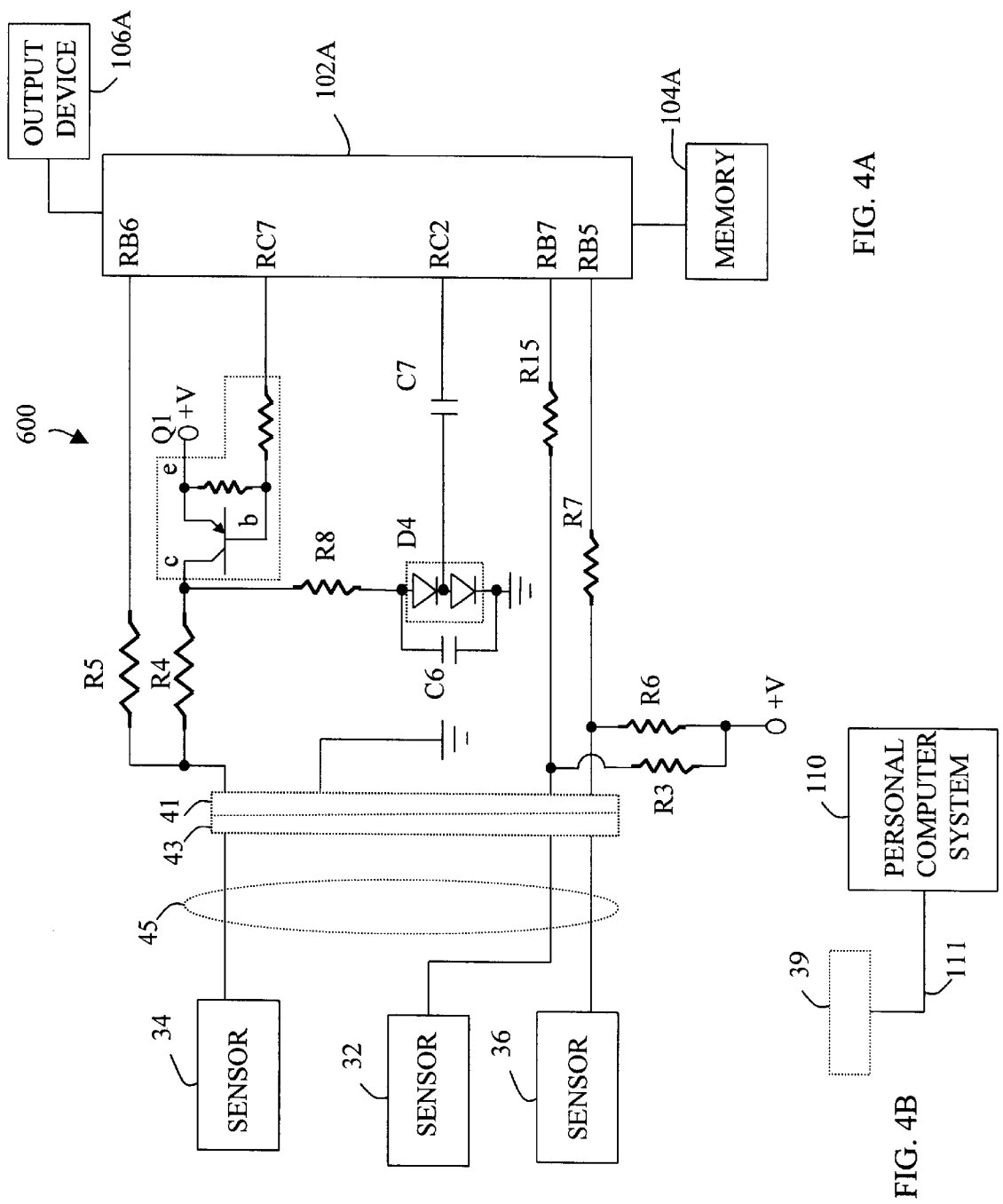
FIG. 4A is an electrical diagram in block and schematic form of an electronic system for monitoring the trailer hitch assembly of FIG. 1A, according to another embodiment of the present invention.
FIG. 4B is an electrical block diagram of a personal computer system, including an interface cable for coupling to the system of FIG. 4A, according to yet another embodiment of the present invention.

FIG. 4A depicts an electrical schematic of relevant portions of an electronic system 600 for monitoring a trailer hitch assembly, according to another embodiment of the present invention. During normal operation, a control circuit 102A (e.g., a microcontroller, such as a PIC16C62X manufactured and made commercially available by Microchip Technology Inc.) is coupled to the sensors 32, 34 and 36 via the cable 45, that includes a connector 43 that mates with a connector 41. An output from the kingpin sensor 34 is provided to an input (RB6) of the circuit 102A, via a resistor R5 (preferably, 100 ohms). An output of the tilt sensor 32 is provided to an input (RB7) of the control circuit 102A, via a resistor R15 (preferably, 100 ohms). When a tilt sensor output is not pulling the input RB7 low, a resistor R3 (preferably, 1 k ohm) pulls the input RB7 to a positive supply voltage +V. An output of the lock sensor 36 is provided to an input RB5 of the circuit 102A via a resistor R7 (preferably, 100 ohms). The input RB5 is pulled to +V, through a resistor R6 (preferably, 1 k ohm), when the output of the lock sensor 36 is not pulling the input RB5 low. The control circuit 102A is also coupled to an output device 106A (e.g., a seven segment display) and the memory 104A (e.g., a EEPROM).

The memory 104A preferably stores coupling status information and includes a history of changes in position of the trailer and the locking mechanism, as respectively sensed by the trailer sensor and the lock sensor. As briefly mentioned above, in certain situations (e.g., after a coupling related accident) it is desirable to download the coupling status information from the memory 104A to an external device, for example, a personal computer system 110 (see FIG. 4B). To download the coupling status information to the personal computer system 110, a user disconnects the sensors 32–36 by decoupling connectors 43 and 41. Next, a user couples the personal computer system 110 to the electronic system 600 by mating connector 39 with the connector 41.

An RS232 cable 111, includes the connector 39, and is connected at an opposite end (via a DB25 connector, not shown) to an RS232 interface of the personal computer system 110. Preferably, the R232 interfaces only utilize the received data, transmitted data and signal ground lines. When the connector 39 is coupled to the connector 41: the transmitted data line is coupled to the RB6 input of the control circuit 102A; the received data line is coupled to the RB5 input of the control circuit 102A; and the signal ground line is coupled to a ground of the electronic system 600. The control circuit 102A is programmed to detect a coupling status information request at power-up, when the system 600 is coupled to the system 110.

Upon power-up of the system 600, the control circuit 102A detects a number three error code (i.e., kingpin not present and lock closed) as the transmitted data line and the received data line are held in a mark condition (i.e., logic '1', negative voltage). While it is possible to achieve a number three error code during normal operation (when the sensors 32, 34 and 36 are all implemented), a data dump from the memory 104A does not occur until a coupling status information request is complete. A second requirement for a coupling status information request to be received by the control circuit 102A is for a number of logic changes to occur on the received data line within a predetermined period of time, for example, 1 second. In a preferred embodiment, the system 110 is programmed to toggle the RB5 input to initiate a data transfer. It is contemplated that data transfers may be initiated in various other ways and that interfaces other than an RS232 interface may be utilized to transfer data from the memory 104A of the system 600.

The control circuit 102A monitors the RB5 input to detect a state change. When the control circuit 102A detects a state change on the RB5 input, it implements a subroutine (e.g., through an interrupt request (IRQ)) that determines whether an edge counter is equal to zero. If so, the edge counter is incremented and an eighty millisecond timer is started, before returning from, for example, the IRQ. If the edge counter is not equal to zero, the subroutine determines whether the last edge was more than eighty milliseconds from the previous edge (i.e., whether the eighty millisecond counter has timed-out). If so, the eighty millisecond counter is restarted. If not, the edge counter is incremented before returning from, for example, the IRQ. When the eighty millisecond counter times out, a subroutine determines whether more than one second has elapsed since the first edge was detected.

If one second has elapsed since the first edge was detected, the subroutine determines whether the edge counter has exceeded a count of one-hundred. If so, the counter unit initiates a data transfer (i.e., a data dump from the memory 104A). Otherwise, the edge counter is cleared before returning from, for example, the IRQ. When the control circuit 102A detects a coupling status information request, as indicated above, the control circuit 102A implements a subroutine that initiates transfer of coupling status information from the memory 104A to the personal computer system 110.

This is preferably accomplished through an RS232 interface of the electronic system 600. The RS232 interface includes a transistor Q1 (i.e., a PNP transistor with an internal base-to-emitter resistor and an internal base current limiting resistor), resistors R4 and R8 (each preferably 510 ohms), capacitors C6 and C7 (each preferably 0.1 microfarads) and a diode package D4 (includes an upper and lower diode). It should be appreciated that in order for the electronic system 600 to provide a logic '1' level, the signal should be between negative 3 volts and negative 25 volts and a logic '0' level should be between positive 3 volts and positive 25 volts for an RS232 interface.

According to the present invention, the control circuit 102A provides a low level signal (e.g., zero volts) on the RC7 output to provide a logic '0'. When the RC7 output is low, the transistor Q1 is turned on, which couples the positive power supply +V (which sources a current) to the transmitted data line, through the resistor R4. This provides a positive voltage greater than three volts on the transmitted data line.

The control circuit 102A also applies a high level signal, e.g., five volts, on the RC2 output, which charges the capacitor C7 through a lower diode of the diode package D4. The capacitor C7 charges to above three volts, while the output RC7 is held high. When the output RC2 transitions to a low signal level and the output RC7 transitions to a high signal level, the capacitor C2 provides a negative voltage, between negative 3 and negative 25 volts, on the transmitted data line. The capacitor C6 is coupled across the diode package D4 and provides transient signal filtering. The circuit 102A is programmed to read the data from the memory 104A and approximately toggle the RC2 and RC7 outputs to provide the data to the system 110. The system 110 can then store and analyze the transmitted data.

Accordingly, an RS232 interface has been described, which is activated by the control circuit 102A responsive to the receipt of a coupling status information request. As previously disclosed, the coupling status information request is initiated when the connector 43 is decoupled from the connector 41 and the personal computer system 110 (implementing an appropriate data transfer routine) is coupled to the electronic system 600.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. An electronic system for monitoring a trailer hitch assembly having a hitch plate with a throat for receiving a kingpin of a trailer and a locking mechanism for locking the kingpin in the throat, the system determining whether the trailer hitch assembly is properly coupled to the trailer, the system comprising:

a trailer sensor for sensing the position of the trailer relative to the trailer hitch assembly;

a lock sensor for sensing the position of the locking mechanism;

a control circuit coupled to the trailer sensor and the lock sensor, the control circuit determining whether the trailer hitch assembly is properly coupled to the trailer;

a memory device coupled to the control circuit, the memory device storing coupling status information that includes a history of changes in position of the trailer and the locking mechanism as respectively sensed by the trailer sensor and the lock sensor; and an output interface coupled to the control circuit, wherein the control circuit is configured to provide the stored coupling status information to an external device through the output interface responsive to a coupling status information request.

2. The system of claim 1, wherein the control circuit determines whether the trailer hitch assembly is properly coupled to the trailer by taking into account the sequence in which the trailer sensor and the lock sensor sense the respective positions of the trailer and the locking mechanism as well as the time period elapsing between the sensing of such positions.

3. The system of claim 1, wherein the trailer sensor includes at least one of a kingpin sensor that senses the position of the kingpin relative to the throat and a tilt sensor that senses the tilt of the hitch plate.

4. The system of claim 1, wherein the output interface simulates an RS232 interface.

5. The system of claim 1, wherein the coupling status information request is received by the control circuit when inputs of the control circuit that are normally associated with the trailer sensor and the lock sensor receive signals which do not occur during normal operation.

6. The system of claim 1, wherein the control circuit masks an output of the lock sensor for a first predetermined stabilization period after the control circuit initially determines that the trailer hitch assembly is properly coupled to the trailer.

7. The system of claim 1, wherein the control circuit only recognizes a change in an output of the trailer sensor and an output of the lock sensor from a current state to a new state when the outputs remain in the new state for a second predetermined stabilization period.

8. An electronic system for monitoring a trailer hitch assembly having a hitch plate with a throat for receiving a kingpin of a trailer and a locking mechanism for locking the kingpin in the throat, the system determining whether the trailer hitch assembly is properly coupled to the trailer, the system comprising:

a trailer sensor for sensing the position of the trailer relative to the trailer hitch assembly;

a lock sensor for sensing the position of the locking mechanism;

a control circuit coupled to the trailer sensor and the lock sensor, the control circuit determining whether the trailer hitch assembly is properly coupled to the trailer, wherein the control circuit masks an output of the lock sensor for a first predetermined stabilization period after the control circuit initially determines that the trailer hitch assembly is properly coupled to the trailer.

9. The system of claim 8, wherein the control circuit determines whether the trailer hitch assembly is properly coupled to the trailer by taking into account the sequence in which the trailer sensor and the lock sensor sense the respective positions of the trailer and the locking mechanism as well as the time period elapsing between the sensing of such positions.

10. The system of claim 8, wherein the first predetermined stabilization period is about one-hundred milliseconds.

11. The system of claim 8, wherein the trailer sensor includes at least one of a kingpin sensor that senses the position of the kingpin relative to the throat and a tilt sensor that senses the tilt of the hitch plate.

12. The system of claim 8, further including:
a memory device coupled to the control circuit, the memory device storing coupling status information that includes a history of changes in position of the trailer and the locking mechanism as respectively sensed by the trailer sensor and the lock sensor; and
an output interface coupled to the control circuit, wherein the control circuit is configured to provide the stored coupling status information to an external device through the output interface responsive to a coupling status information request.

13. The system of claim 12, wherein the output interface simulates an RS232 interface.

14. The system of claim 12, wherein the coupling status information request is received by the control circuit when inputs of the control circuit that are normally associated with the trailer sensor and the lock sensor receive signals which do not occur during normal operation.

15. The system of claim 8, wherein the control circuit only recognizes a change in an output of the trailer sensor and the output of the lock sensor from a current state to a new state when the outputs remain in the new state for a second predetermined stabilization period.

16. The system of claim 15, wherein the second predetermined stabilization period is about six milliseconds.

17. A hitching system, comprising:
a trailer hitch assembly having a hitch plate with a throat for receiving a kingpin of a trailer and a locking mechanism for locking the kingpin in the throat;
a trailer sensor for sensing the position of the trailer relative to the trailer hitch assembly;
a lock sensor for sensing the position of the locking mechanism; and
a control circuit coupled to the trailer sensor and the lock sensor, the control circuit determining whether the trailer hitch assembly is properly coupled to the trailer, wherein the control circuit masks an output of the lock sensor for a first predetermined stabilization period after the control circuit initially determines that the trailer hitch assembly is properly coupled to the trailer.

18. The system of claim 17, wherein the control circuit determines whether the trailer hitch assembly is properly coupled to the trailer by taking into account the sequence in which the trailer sensor and the lock sensor sense the respective positions of the trailer and the locking mechanism as well as the time period elapsing between the sensing of such positions.

19. The system of claim 17, further including:
a display device coupled to the control circuit, the display device displaying coupling status information to a driver of the vehicle.

20. The system of claim 17, further including:
a memory device for storing coupling status information, the coupling status information including a history of changes in position of the trailer and the locking mechanism as respectively sensed by the trailer sensor and the lock sensor.

21. The system of claim 17, wherein the first predetermined stabilization period is about one-hundred milliseconds.

22. The system of claim 17, wherein the trailer sensor includes at least one of a kingpin sensor that senses the position of the kingpin relative to the throat and a tilt sensor that senses the tilt of the hitch plate.

23. The system of claim 17, further including:
a memory device coupled to the control circuit, the memory device storing coupling status information that includes a history of changes in position of the trailer and the locking mechanism as respectively sensed by the trailer sensor and the lock sensor; and
an output interface coupled to the control circuit, wherein the control circuit is configured to provide the stored status information to an external device through the output interface responsive to a coupling status information request.

24. The system of claim 23, wherein the output interface simulates an RS232 interface.

25. The system of claim 23, wherein the coupling status information request is received by the control circuit when inputs of the control circuit that are normally associated with the trailer sensor and the lock sensor receive signals which do not occur during normal operation.

26. The system of claim 17, wherein the control circuit only recognizes a change in the outputs of the trailer sensor and the lock sensor from a current state to a new state when the outputs remain in the new state for a second predetermined stabilization period.

27. The system of claim 17, wherein the second predetermined stabilization period is about six milliseconds.

28. The system of claim 17, wherein the control circuit is a microcontroller.

29. A hitching system, comprising:
a trailer hitch assembly having a hitch plate with a throat for receiving a kingpin of a trailer and a locking mechanism for locking the kingpin in the throat;
a trailer sensor for sensing the position of the trailer relative to the trailer hitch assembly;
a lock sensor for sensing the position of the locking mechanism; and
a control circuit coupled to the trailer sensor and the lock sensor, the control circuit determining whether the trailer hitch assembly is properly coupled to the trailer, wherein the control circuit only recognizes a change in an output of the trailer sensor and an output of the lock sensor from a current state to a new state when the outputs remain in the new state for a predetermined stabilization period.

30. The system of claim 29, wherein the control circuit determines whether the trailer hitch assembly is properly coupled to the trailer by taking into account the sequence in which the trailer sensor and the lock sensor sense the respective positions of the trailer and the locking mechanism as well as the time period elapsing between the sensing of such positions.

* * * * *